United States Patent
Ohashi et al.

(10) Patent No.: US 12,063,292 B2
(45) Date of Patent: Aug. 13, 2024

(54) PROPRIETOR TERMINAL, USER TERMINAL, AND NEW PROPRIETOR TERMINAL

(71) Applicant: Nippon Telegraph and Telephone Corporation, Tokyo (JP)

(72) Inventors: Shigenori Ohashi, Yokosuka (JP); Atsushi Nakadaira, Yokosuka (JP); Shigeru Fujimura, Yokosuka (JP); Masayoshi Chikada, Yokosuka (JP); Tatsuro Ishida, Yokosuka (JP); Hiroki Watanabe, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 509 days.

(21) Appl. No.: 17/292,864

(22) PCT Filed: Nov. 12, 2019

(86) PCT No.: PCT/JP2019/044246
§ 371 (c)(1),
(2) Date: May 11, 2021

(87) PCT Pub. No.: WO2020/100855
PCT Pub. Date: May 22, 2020

(65) Prior Publication Data
US 2021/0399877 A1    Dec. 23, 2021

(30) Foreign Application Priority Data
Nov. 13, 2018 (JP) .................... 2018-213173

(51) Int. Cl.
*H04L 29/06* (2006.01)
*H04L 9/06* (2006.01)
(Continued)

(52) U.S. Cl.
CPC .......... *H04L 9/0643* (2013.01); *H04L 9/3247* (2013.01); *H04L 45/7453* (2013.01); *H04L 9/50* (2022.05)

(58) Field of Classification Search
CPC ....... H04L 9/0643; H04L 9/3247; H04L 9/50; H04L 45/7453
See application file for complete search history.

(56) References Cited

U.S. PATENT DOCUMENTS

2004/0243773 A1 * 12/2004 Fischer ............... G06F 16/2343
711/163
2015/0188940 A1 * 7/2015 Lapidous ........... H04L 63/0272
726/25

FOREIGN PATENT DOCUMENTS

| WO | WO 2018056445 | 3/2018 | |
| WO | WO-2018056445 A1 * | 3/2018 | ............. G06Q 20/32 |
| WO | WO 2018065441 | 4/2018 | |

OTHER PUBLICATIONS

Mathis Steichen, Blockchain-Based, Decentralized Access Control for IPFS, Aug. 2018, pp. 1499-1506 (Year: 2018).*

(Continued)

*Primary Examiner* — Rodman Alexander Mahmoudi
(74) *Attorney, Agent, or Firm* — Fish & Richardson P.C.

(57) ABSTRACT

A proprietor terminal stores state data in which an identifier of a contract executed in a blockchain system, a hash value of control target file data that specifies content data managed by the contract, and an identifier of a proprietor and an identifier of a user of the content data in the file management system are associated with one another, and includes a route object generation unit that generates reference destination data having the identifier of the contract and generates route object data having the reference destination data and a link name and the hash value of the control target file data.

7 Claims, 19 Drawing Sheets

(51) Int. Cl.
   *H04L 9/32*      (2006.01)
   *H04L 45/7453*   (2022.01)
   *H04L 9/00*      (2022.01)

(56) References Cited

OTHER PUBLICATIONS

Benet, "IPFS—Content Addressed, Versioned, P2P File System (Draft 3)," arXiv preprint arXiv:1407.3561, 2014, 11 pages.
Steichen et al., "Blockchain-Based, Decentralized Access Control for IPFS," 2018 IEEE Confs on Internet of Things, Green Computing and Communications, Cyber, Physical and Social Computing, Smart Data, Blockchain, Computer and Information Technology, Congress on Cybermatics, Jul. 2018, pp. 1499-1506.

\* cited by examiner

FIG. 6

Bs STATE DATA

| IDENTIFIER OF CONTRACT | HASH VALUE OF ROUTE OBJECT DATA | IDENTIFIER OF CONTROL TARGET FILE DATA | IDENTIFIER OF PROPRIETOR (BLOCKCHAIN SYSTEM) | IDENTIFIER OF PROPRIETOR (FILE MANAGEMENT SYSTEM) | IDENTIFIER OF USER (FILE MANAGEMENT SYSTEM) |
|---|---|---|---|---|---|
| .... | .... | .... | .... | .... | .... |
| | | .... | .... | .... | .... |
| .... | .... | .... | .... | .... | .... |
| | | .... | .... | .... | .... |

FIG. 13

Obj' ROUTE OBJECT DATA

| SUBORDINATE OBJECT MANAGEMENT DATA | | | | | |
|---|---|---|---|---|---|
| LINK NAME | LinkX | LinkA | LinkB | LinkC | ... |
| HASH VALUE OF LINK DESTINATION | FileX | FileA | FileB | FileC | ... |
| ... | ... | ... | ... | ... | ... |

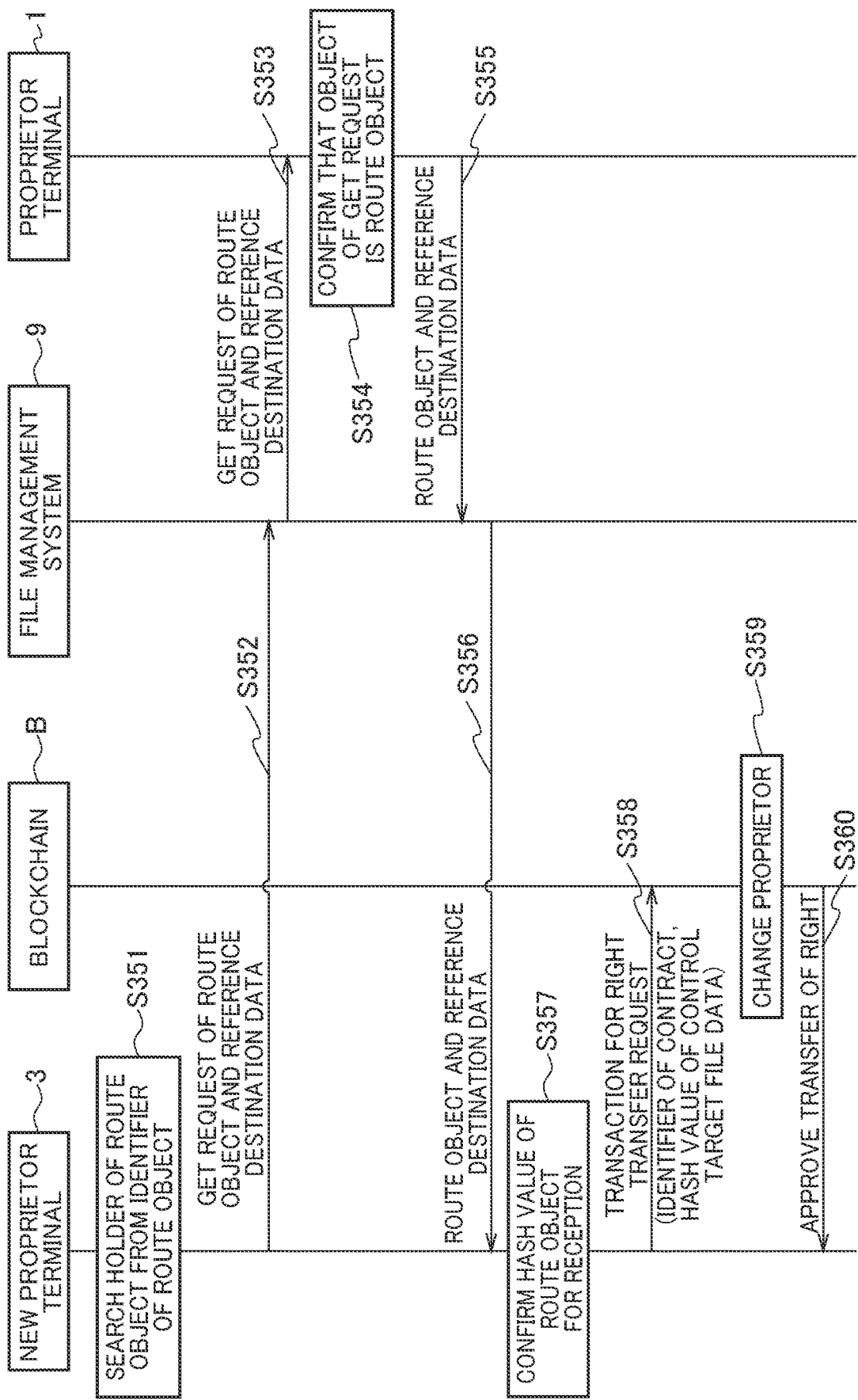

PROPRIETOR TERMINAL, USER TERMINAL, AND NEW PROPRIETOR TERMINAL

CROSS-REFERENCE TO RELATED APPLICATIONS

This application is a National Stage application under 35 U.S.C. § 371 of International Application No. PCT/JP2019/044246, having an International Filing Date of Nov. 12, 2019, which claims priority to Japanese Application Serial No. 2018-213173, filed on Nov. 13, 2018. The disclosure of the prior application is considered part of the disclosure of this application, and is incorporated in its entirety into this application.

TECHNICAL FIELD

The present invention relates to a proprietor terminal that is used by a proprietor of content and transmits permission data for the content to a user of the content, a user terminal that is used by the user of the content and transmits permission request data for the content to the proprietor of the content, and a new proprietor terminal that is used by a new proprietor to whom right of the content is transferred from the user of the content.

BACKGROUND ART

In transactions of digital cryptocurrencies, a blockchain which is a type of a decentralized distributed ledger is used. In the blockchain, pieces of information on transactions of cryptocurrencies communicated among participants are collected in units of blocks to form the blockchain. With respect to a structure of the blockchain, as the term chain implies, each block is recorded in a manner in which each block is linked to a previous block. Specifically, each block is linked by including a hash value of the previous block in the block.

If transaction information included in a block at a certain point in time is falsified, a hash value of the falsified block is changed. This causes the necessity to falsify all blocks at and after the falsified block. Further, the addition of a block requires a very computationally intensive process (mining) of finding additional information (nonce) in which a hash value of a block matches a specific condition. From the coupling of the above factors, the blockchain has a mechanism that is extremely robust against the falsification.

A programmable blockchain is proposed in Ethereum. A program code which is also called a contract is registered in a blockchain in advance. After a transaction specifying the execution of the contract is input, the program code is executed if the transaction is included in a block. The execution result is stored in state data of the blockchain.

Examples of distributed file management systems that do not presume privileged nodes include IPFS (Inter Planetary File System) (see Non-patent document 1). In IPFS, a file is divided into blocks of a specific size to be managed by terminals that belong to IPFS. The file is recognized by an identifier generated from a hash value, and the falsification of the file is not possible. The dispersibility and an ID structure of IPFS can ensure the transparency and reliability.

Focusing on the fact that the mechanism is extremely robust against falsifications of the blockchain, there is a system that integrates a distributed file management system and a blockchain (see Non-patent document 2). In Non-patent document 2, a file is divided into chunks. Individual chunks are grouped in a DAG (Directed Acyclic Graph), and pieces of information on the chunks of link destinations are described to the chunks. In Non-patent document 2, identifiers of all of the chunks forming DAG are individually registered in the blockchain.

PRIOR ART DOCUMENT

Non-Patent Document

Non-patent document 1: Juan Banet, "IPFS-Content Addressed, Versioned, P2P File System (DRAFT 3)", [Online], [Retrieved on Oct. 30, 2018], Internet <URL: https://ipfs.io/ipfs/QmR7GSQM93Cx5eAg6a6yRzNde1FQv7uL6X1o4k7zrJa3LX/ipfs.draft3.pdf>

Non-patent document 2: Mathis Steichen, et al., "Blockchain-Based, Decentralized Access Control for IPFS", [Online], [Retrieved on Oct. 15, 2018], Internet <URL: https://www.researchgate.net/publication/327034734_Blockchain-Based_Decentralized_Access_Control_for_IPFS>

SUMMARY OF THE INVENTION

Problem to be Solved by the Invention

In Non-patent document 2, identifiers of all of the chunks are aggregated in state data of the blockchain, and thus, it is possible that an entire distributed file system is affected by a bug of the contract or an attack against the contract.

Further, in the distributed file management system, as a size of a file becomes large, the number of chunks increases more, but in Non-patent document 2, the identifiers of individual chunks are registered, and this leads to a bloating of a blockchain ledger. Further, processes of transactions related to the files of a larger size are costly, and thus, it is possible that the throughput of the transactions in the blockchain is lowered.

Accordingly, an object of the present invention is to provide a proprietor terminal, a user terminal, and a new proprietor terminal, which can distribute information on content registered in a distributed file management system and register the information in a distributed ledger.

Means for Solving the Problem

To solve the above problem, a first feature of the present invention relates to a proprietor terminal that is used by a proprietor of content and is connected to a distributed ledger system having a distributed ledger and a file management system. The proprietor terminal according to the first feature of the present invention includes a storage device that stores content data and state data in which an identifier of a contract executed in the distributed ledger system, a hash value of control target file data that specifies the content data managed by the contract, and an identifier of the proprietor and an identifier of a user of the content data in the file management system are associated with one another, a route object generation unit that generates reference destination data having the identifier of the contract and transmits a transaction for generating route object data having the reference destination data and a link name and the hash value of the control target file data and storing the route object data in the storage device, and a file management control unit that notifies a hash value of the route object data and the hash value of the control target file data in association with the identifier of the proprietor in the file management system.

The proprietor terminal may further include a sharing unit that, after receiving a use request having the hash value of the control target file data from the user terminal via the file management system, transmits the content data specified by the control target file data to a user terminal used by the user via the file management system if an identifier of the user associated with the identifier of the contract of the reference destination data corresponding to the hash value of the control target file data and the hash value of the control target file data in the state data matches the identifier of the user as a transmission source.

The proprietor terminal may further include a transfer unit that, after receiving a transfer request having the hash value of the control target file data from a new proprietor terminal used by a new proprietor of the content via the file management system, transmits the content data specified by the control target file data to the new proprietor terminal used by a new proprietor of the content via the file management system if an identifier of the proprietor associated with the identifier of the contract of the reference destination data corresponding to the hash value of the control target file data and the hash value of the control target file data in the state data matches the identifier of the new proprietor as a transmission source, and deletes the content data from the storage device after receiving, from the new proprietor terminal, a notification that the new proprietor terminal holds the content data.

The route object data may include a link name and a hash value of the reference destination data instead of including the reference destination data.

A second feature of the present invention relates to a user terminal that is used by a user of content and is connected to a distributed ledger system having a distributed ledger and a file management system. The user terminal according to the second feature of the present invention includes a storage device that stores state data in which an identifier of a contract executed in the distributed ledger system, a hash value of control target file data that specifies content data managed by the contract, and an identifier of a proprietor and an identifier of the user of the content data in the file management system are associated with one another, and route object data including reference destination data having the identifier of the contract, and a link name and the hash value of the control target file data and a use unit that acquires, from the state data, an identifier of the proprietor associated with the identifier of the contract of the reference destination data corresponding to the hash value of the control target file data and the hash value of the control target file data, transmits a use request having the hash value of the control target file data to a proprietor terminal used by the proprietor via the file management system, and receives the content data via the file management system.

The storage device may store the route object data including a link name and a hash value of the reference destination data and the reference destination data instead of including the reference destination data.

A third feature of the present invention relates to a new proprietor terminal that is used by a new proprietor to whom right of content is transferred from a proprietor of the content and is connected to a distributed ledger system having a distributed ledger and a file management system. The new proprietor terminal according to the third feature of the present invention includes a storage device that stores state data in which an identifier of a contract executed in the distributed ledger system, a hash value of control target file data that specifies content data managed by the contract, and an identifier of the proprietor and an identifier of a user of the content data in the file management system are associated with one another, and route object data including reference destination data having the identifier of the contract and, a link name and the hash value of the control target file data, a transfer request unit that acquires, from the state data, an identifier of the proprietor associated with the identifier of the contract of the reference destination data corresponding to the hash value of the control target file data and the hash value of the control target file data, transmits, to the distributed ledger system, a transaction for changing the identifier of the proprietor to the identifier of the new proprietor, the transaction specifying the identifier of the contract of the reference destination data corresponding to the hash value of the control target file data and the hash value of the control target file data, transmits a transfer request having the hash value of the control target file data to a proprietor terminal used by the proprietor via the file management system, and receives the content data via the file management system, and a file management control unit that transmits a notification that the new proprietor terminal holds the content data.

The storage device may store the route object data including a link name and a hash value of the reference destination data, and the reference destination data instead of including the reference destination data.

A fourth feature of the present invention relates to a proprietor program for causing a computer function as the proprietor terminal according to the first feature of the present invention.

A fifth feature of the present invention relates to a user program for causing a computer to function as the user terminal according to the second feature of the present invention.

A sixth feature of the present invention relates to a new proprietor program for causing a computer to function as the new proprietor terminal according to the third feature of the present invention.

A seventh feature of the present invention relates to a content use system including a proprietor terminal that is used by a proprietor of content and is connected to a distributed ledger system having a distributed ledger and a file management system, and a user terminal that is used by a user of the content and is connected to the distributed ledger system and the file management system. In the content use system according to the seventh feature of the present invention, the proprietor terminal includes a storage device that stores content data and state data in which an identifier of a contract executed in the distributed ledger system, a hash value of control target file data that specifies the content data managed by the contract, and an identifier of the proprietor and an identifier of the user of the content data in the file management system are associated with one another, a route object generation unit that generates reference destination data having the identifier of the contract, and transmits a transaction for generating route object data having the reference destination data and a link name and the hash value of the control target file data and storing the route object data in the storage device, a file management control unit that notifies a hash value of the route object data and the hash value of the control target file data in association with the identifier of the proprietor in the file management system, and a sharing unit that, after receiving a use request having the hash value of the control target file data from the user terminal via the file management system, transmits the content data specified by the control target file data to the user terminal used by the user via the file management system if an identifier of the user associated with the identifier of the contract of the reference destination data corresponding to the hash value of the control target file data and the hash value of the control target file data in the state data matches the identifier of the user as a transmission source, and the user terminal includes a storage device that stores the state data and the route object data, and a use unit that acquires, from the state data, an identifier of the proprietor associated with the identifier of the contract of the reference destination data corresponding to the hash value of the control target file data and the hash value of the control target file data, transmits the use request having the hash value of the control target file data to the proprietor terminal used by the proprietor via the file management system, and receives the content data via the file management system.

An eighth feature of the present invention relates to a content use system including a proprietor terminal that is used by a proprietor of content and is connected to a distributed ledger system having a distributed ledger and a file management system, and a new proprietor terminal that is used by a new proprietor to whom right of the content is transferred from the proprietor of the content and is connected to the distributed ledger system and the file management system. In the content use system according to the eighth feature of the present invention, the proprietor terminal includes a storage device that stores content data and state data in which an identifier of a contract executed in the distributed ledger system, a hash value of control target file data that specifies the content data managed by the contract, and an identifier of the proprietor and an identifier of a user of the content data in the file management system are associated with one another, a route object generation unit that generates reference destination data having the identifier of the contract, generates route object data having the reference destination data and a link name and the hash value of the control target file data, and stores the route object data in the storage device, a file management control unit that notifies a hash value of the route object data and the hash value of the control target file data in association with the identifier of the proprietor in the file management system, and a transfer unit that, after receiving a transfer request having the hash value of the control target file data from a new proprietor terminal used by a new proprietor of the content via the file management system, transmits the content data specified by the control target file data to the new proprietor terminal via the file management system if an identifier of the proprietor associated with the identifier of the contract of the reference destination data corresponding to the hash value of the control target file data and the hash value of the control target file data in the state data matches the identifier of the new proprietor as a transmission source, and deletes the content data from the storage device after receiving, from the new proprietor terminal, a notification that the new proprietor terminal holds the content data, and the new proprietor terminal includes a storage device that stores the state data and the route object data, a transfer request unit that acquires, from the state data, an identifier of the proprietor associated with the identifier of the contract of the reference destination data corresponding to the hash value of the control target file data and the hash value of the control target file data, transmits a transaction for changing the identifier of the proprietor to the identifier of the new proprietor to the distributed ledger system, the transaction specifying the identifier of the contract of the reference destination data corresponding to the hash value of the control target file data and the hash value of the control target file data, transmits a transfer request having the hash value of the control target file data to the proprietor terminal used by the proprietor via the file management system, and receives the content data via the file management system, and a file management control unit that transmits the notification that the new proprietor terminal holds the content data.

The route object data according to the seventh or eighth feature of the present invention may include a link name and a hash value of the reference destination data instead of including the reference destination data.

A ninth feature of the present invention relates to a data structure of route object data used for content management data included in a content use system including a distributed ledger system having a distributed ledger and a file management system. In the ninth feature of the present invention, the distributed ledger includes state data in which an identifier of a contract executed in the distributed ledger system, a hash value of control target file data that specifies content data managed by the contract, and an identifier of a proprietor and an identifier of a user of the content data in the file management system are associated with one another, a terminal that is connected to the distributed ledger system and the file management system includes route object data having reference destination data having the identifier of the contract and a link name and the hash value of the control target file data, and the terminal acquires the identifier of the proprietor or the identifier of the user of the content data specified by the control target file data from the distributed ledger based on the identifier of the contract corresponding to the hash value of the control target file data.

The route object data may include a link name and a hash value of the reference destination data instead of including the reference destination data.

Effect of the Invention

According to the present invention, it is possible to provide a proprietor terminal, a user terminal, and a new proprietor terminal.

BRIEF DESCRIPTION OF THE DRAWINGS

FIG. 6 is a diagram for explaining an example of state data used in a content use system according to an embodiment of the present invention.

FIG. 13 is a diagram for explaining an example of a data structure of route object data used in a content use system according to a modified example.

FIG. 15A is a sequence diagram for explaining processes of a new proprietor terminal requesting transfer of content data to a proprietor terminal in a content use system according to a modified example (Part 1).

MODE FOR CARRYING OUT THE INVENTION

Figure 1:
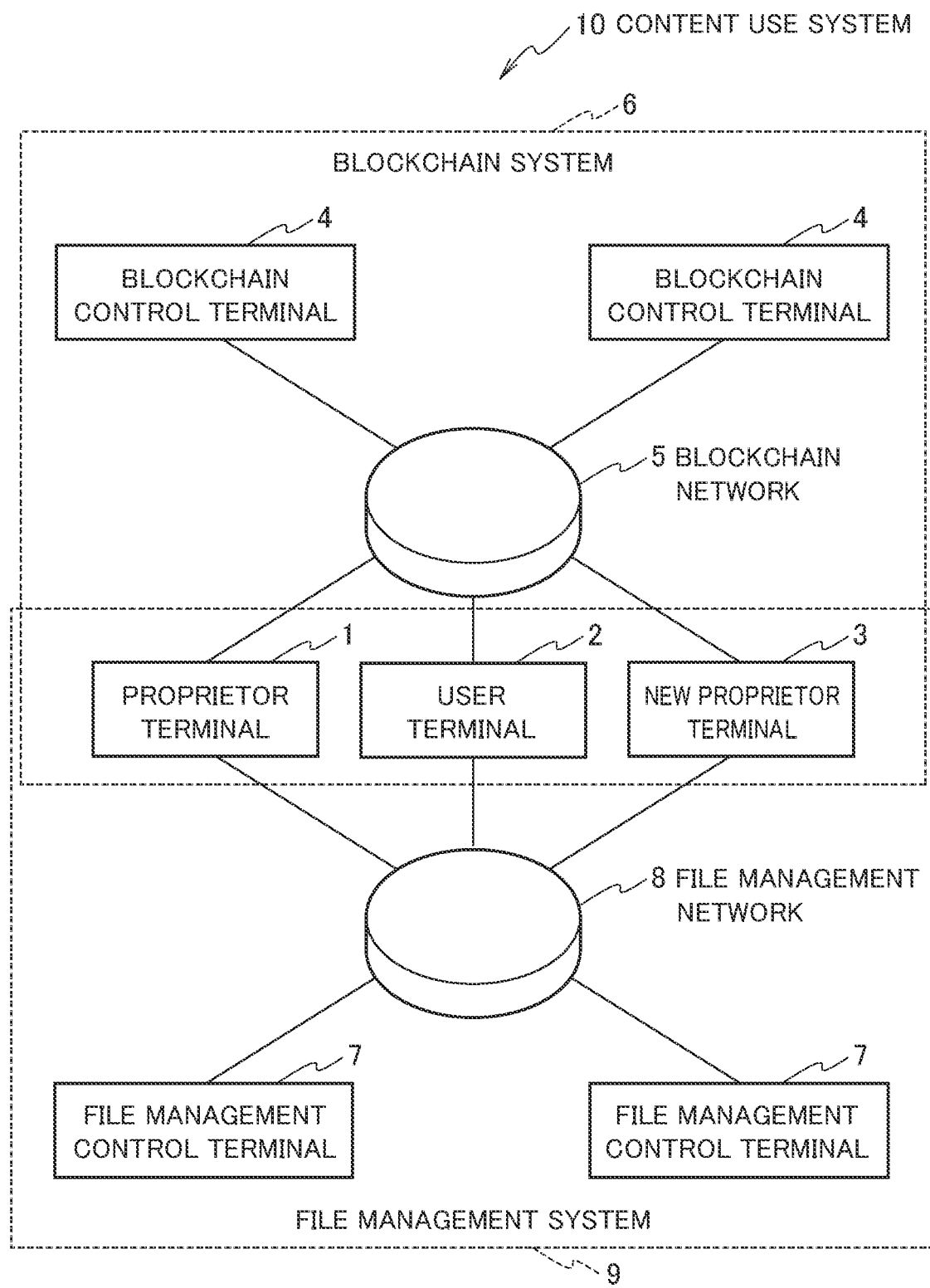
FIG. 1 is a diagram for explaining a configuration of a content use system according to an embodiment of the present invention.

Next, an embodiment of the present invention will be described with reference to the drawings. In the following descriptions of the drawings, the same or similar parts are denoted with the same or similar reference numerals.

(Content Use System)

A content use system 10 using a proprietor terminal 1, a user terminal 2, and a new proprietor terminal 3 according to an embodiment of the present invention will be described. The content use system 10 includes a blockchain system (a distributed ledger system) 6 and a file management system 9.

Figure 5:
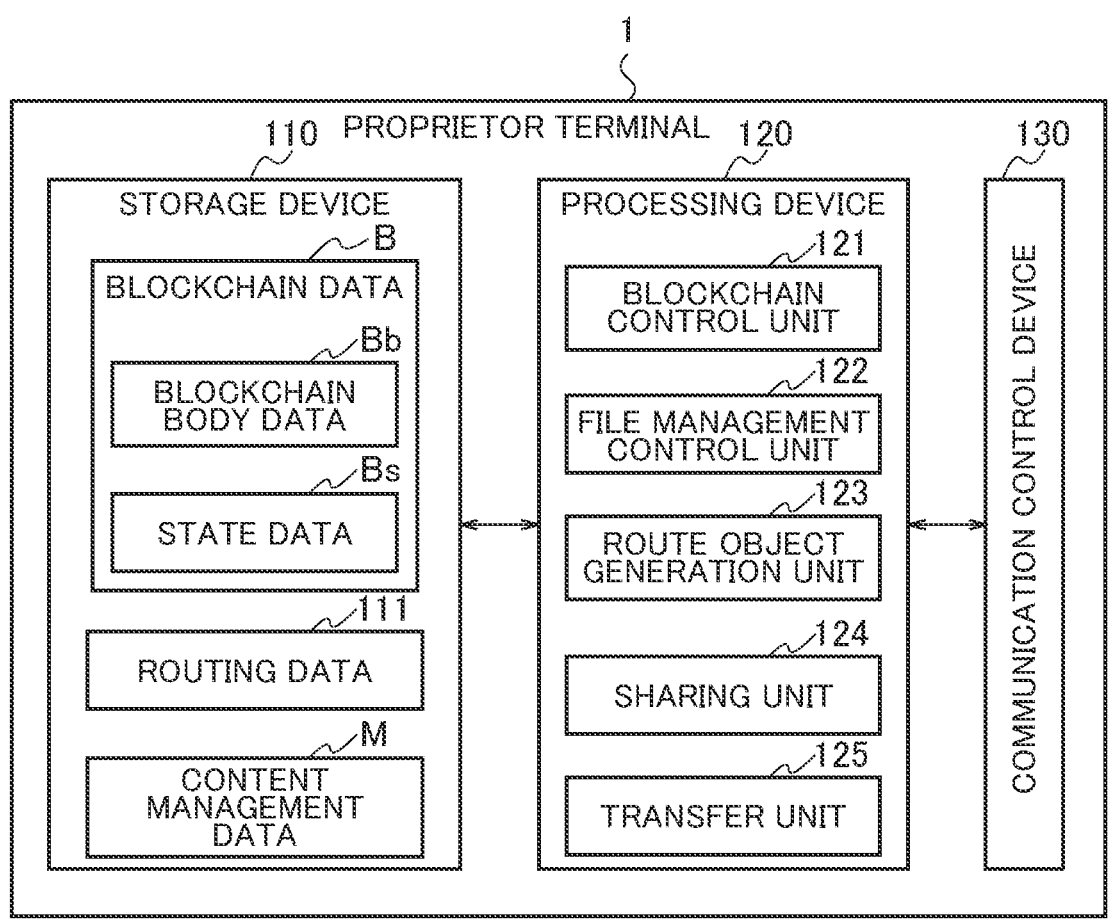
FIG. 5 is a diagram for explaining a hardware configuration and functional blocks of a proprietor terminal according to an embodiment of the present invention.
Figure 7:
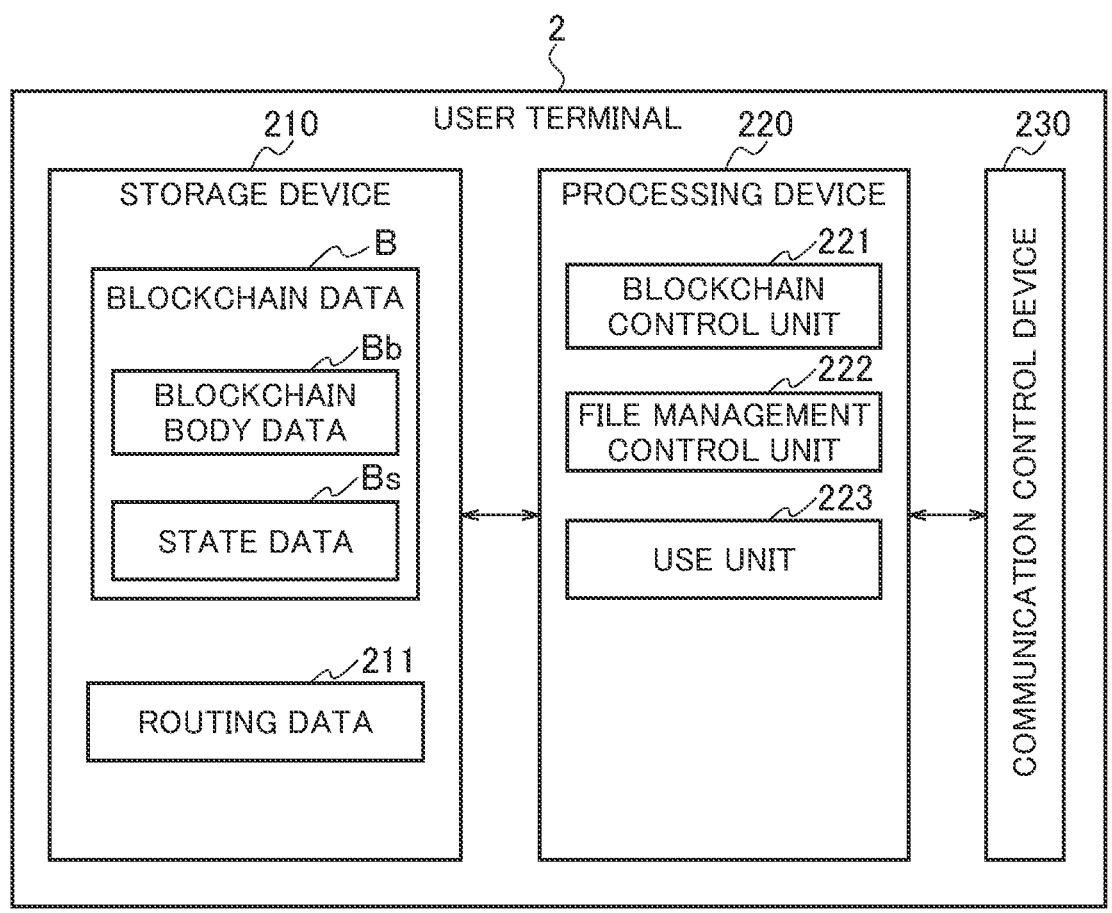
FIG. 7 is a diagram for explaining a hardware configuration and functional blocks of a user terminal according to an embodiment of the present invention.
Figure 8:
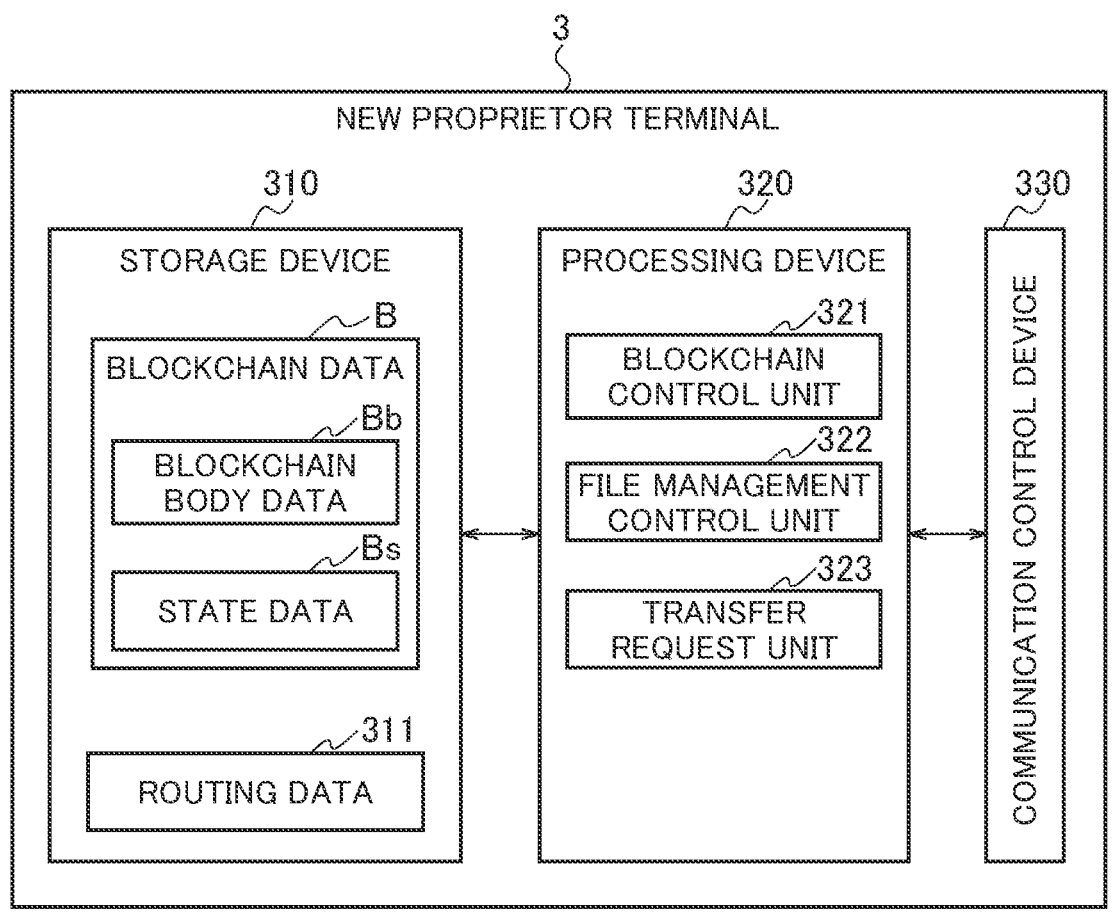
FIG. 8 is a diagram for explaining a hardware configuration and functional blocks of a new proprietor terminal according to an embodiment of the present invention.

In the blockchain system 6, blockchain data (distributed ledger) B is shared among terminals that belong to the system. The blockchain data B is data in which blocks including transactions issued by the terminals that belong to the system are linked. The blockchain system 6 includes the proprietor terminal 1, the user terminal 2, and the new proprietor terminal 3. The blockchain system 6 may further include a plurality of blockchain control terminals 4. Each terminal that belongs to the blockchain system 6 makes P2P (Peer to Peer) connection via a blockchain network 5. As shown in FIGS. 5, 7, and 8, each terminal that belongs to the blockchain system 6 includes the blockchain data B and a blockchain control unit for synchronizing the blockchain data B.

Control information on content data distributed in the content use system 10 is registered in the blockchain data B. The control information includes identifiers or the like of a proprietor and a user of the content data in the file management system 9.

The file management system 9 includes the proprietor terminal 1, the user terminal 2, and the new proprietor terminal 3. The file management system 9 may further include a plurality of file management control terminals 7. In an embodiment of the present invention, the file management system 9 is a decentralized distributed file management system in which terminals that belong to the file management system 9 such as IPFS are individually distributed and manage the files. Each terminal that belongs to the file management system 9 makes P2P connection via a file management network 8.

The proprietor terminal 1 is used by a proprietor of content and is connected to the blockchain system 6 and the file management system 9. The user terminal 2 is used by a user of content and is connected to the blockchain system 6 and the file management system 9. The new proprietor terminal 3 is used by a new proprietor to whom right of the content is transferred from the proprietor of the content, and is connected to the blockchain system 6 and the file management system 9. The blockchain control terminal 4 is used by users of the blockchain system 6 except for the proprietor, the user and the new proprietor of the content. The file management control terminal 7 is used by users of the file management system 9 except for the proprietor, the user and the new proprietor of the content.

In an example shown in FIG. 1, the number of the blockchain control terminal 4 and the file management control terminal 7 may be any number. The blockchain control terminals 4 and the file management control terminals 7 may be different from one another, or a single terminal may have functions of the blockchain control terminal 4 and the file management control terminal 7.

In an embodiment of the present invention, a case is described in which an example of a distributed ledger is a blockchain, and pieces of information on the proprietor and the user of the content are registered in the blockchain, but the present invention is not limited to the case. For example, the pieces of information on the proprietor and the user of the content may be registered by using another distributed ledger instead of using the blockchain.

(Content Management Data)

Content management data M according to an embodiment of the present invention will be described with reference to FIG. 2. The content management data M is generated by the proprietor terminal 1. In the content management data M, content data to be registered in the file management system 9 is managed. The content management data M is provided in response to a request from another terminal.

The content management data M is data for managing the content data. If a size of the content data is larger than a data size of a single chunk, the content management data M does not substantially include the content data as shown in FIG. 2. The content data is divided into chunks of a predetermined size and the divided chunks are grouped in a DAG. The content management data M includes a plurality of pieces of control target file data and a plurality of pieces of non-control target file data for specifying each content data, and route object data Obj. If a size of the content data is smaller than a data size of a single chunk, the control target file data itself becomes the content data, and thus, the content management data M substantially includes the content data.

Figure 2:
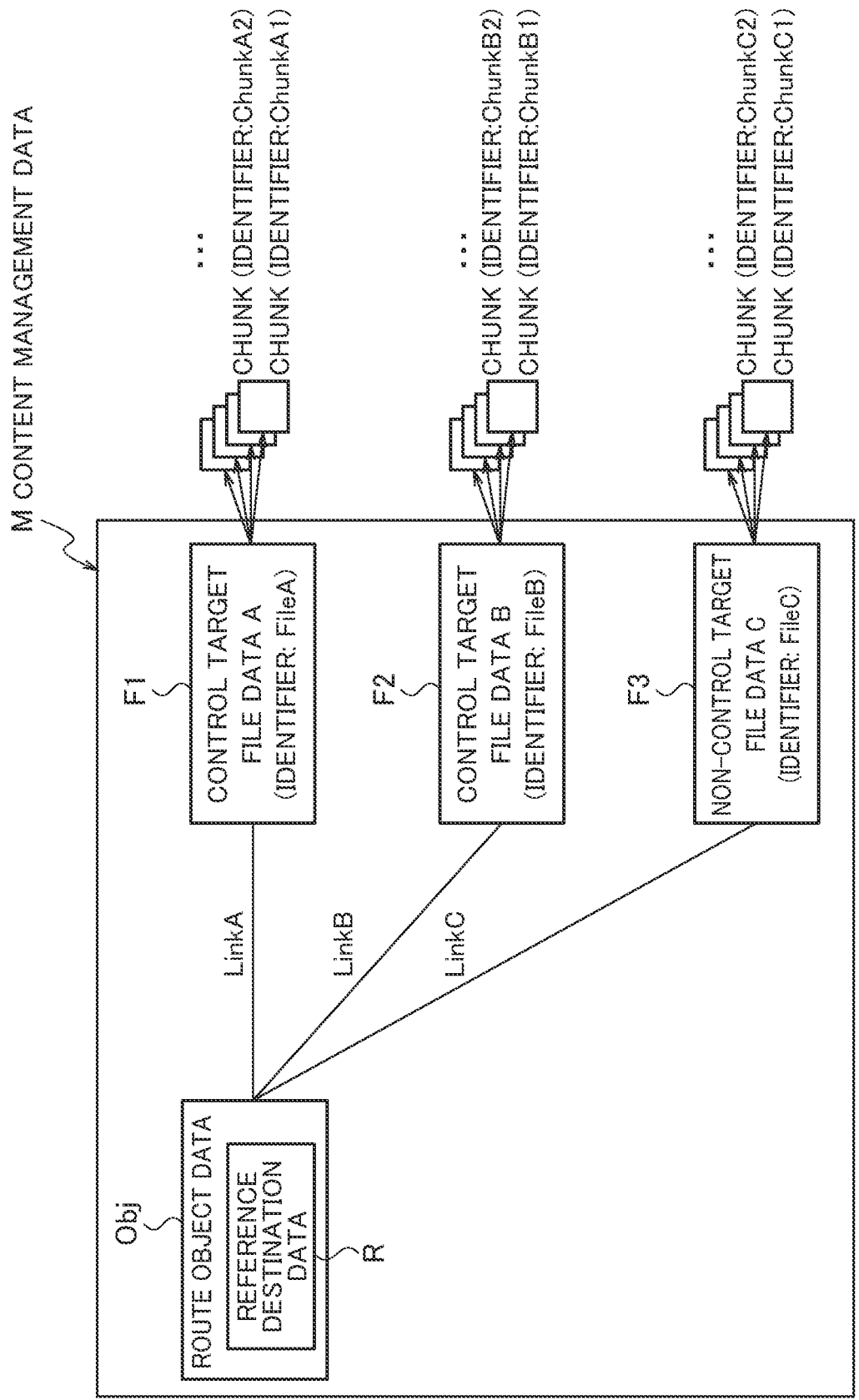
FIG. 2 is a diagram for explaining content management data used in a content use system according to an embodiment of the present invention.

In an example shown in FIG. 2, the content management data M includes control target file data A denoted with F1 in FIG. 2, control target file data B denoted with F2 in FIG. 2, and non-control target file data C denoted with F3 in FIG. 2. The control target file data is data for specifying content data corresponding to control information registered in the blockchain data B. The non-control target file data is data for specifying content data in which the control information is not registered in the blockchain data B. For example, the control target file data specifies video data and music content to be provided to the user. A non-control target file specifies data associated with the control target file such as a fingerprint for probabilistically specifying the content data, and is set in any manner.

The control target file data A denoted with F1 has information on link names and hash values and the like of the chunks linked to the control target file data A denoted with F1 among the chunks divided from the content data A. In the example shown in FIG. 2, the control target file data A denoted with F1 includes information on the link names, hash values, sizes and the like of individual chunks such as a chunk of a hash value ChunkA1 and a chunk of a hash value ChunkA2.

Similarly, the control target file data B denoted with F2 has information on the link names and the hash values of the individual chunks linked to the control target file data B denoted with F2 among the chunks divided from the content data B. The non-control target file data C denoted with F3 has information on the link names and the hash values of the chunks linked to the non-control target file data C denoted with F3 among the chunks divided from the content data C.

A hash value FileA of the control target file data A denoted with F1 is calculated from data of the control target file data A denoted with F1, and the hash value FileA is used as the identifier of the control target file data A denoted with F1. Similarly, a hash value FileB of the control target file data B denoted with F2 is calculated from data of the control target file data B denoted with F2, and the hash value FileB is used as the identifier of the control target file data B denoted with F2. A hash value FileC of the non-control target file data C denoted with F3 is calculated from data of the non-control target file data C denoted with F3, and the hash value FileC is used as the identifier of the non-control target file data C denoted with F3. Each identifier of the control target files or the non-control target file also functions as the identifier of the subordinate content data.

Figure 3:
FIG. 3 is a diagram for explaining an example of a data structure of route object data used in a content use system according to an embodiment of the present invention.

As shown in FIG. 3, the route object data Obj includes pieces of data of the hash values, the link names, the sizes, and the like of the control target file data and the non-control target file data linked to the route object data Obj, and reference destination data R. In the content management data M shown in FIG. 2, the route object data Obj associates the link name LinkA with the hash value FileA for the control target file data A denoted with F1, associates the link name LinkB with the hash value FileB for the control target file data B denoted with F2, and associates the link name LinkC with the hash value FileC for the non-control target file data C denoted with F3.

In an embodiment of the present invention, the blockchain data B holds identifiers of the proprietor and the user in the file management system 9 as control information on the content data specified by the control target file data. In an embodiment of the present invention, the blockchain data B divides control information on each content data used in the content use system 10 into a plurality of contracts for storage. Therefore, the reference destination data R is used for specifying the contract of the blockchain data B to be updated when the identifier of the proprietor or the user is set, changed, deleted or the like.

Figure 4:
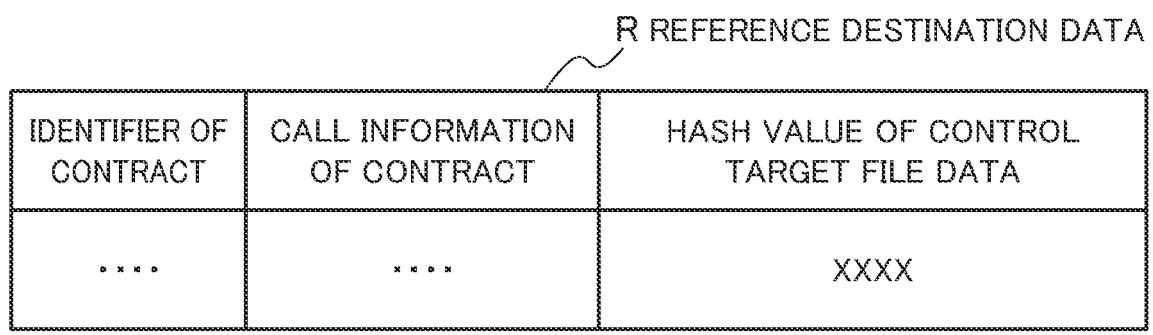
FIG. 4 is a diagram for explaining an example of a data structure of reference destination data used in a content use system according to an embodiment of the present invention.

As shown in FIG. 4, the reference destination data R includes the identifier of the contract, call information when the contract is called, and information for specifying the control target file data. The identifier of the contract specifies a position of the blockchain data B at which the control information on the content data managed by the content management data M is registered. The identifier of the contract is also the identifier of the contract which performs processes concerning information on the content data managed by the content management data M. As the call information on the contract, information on a function name, an argument and the like when processes concerning the content data managed by the content management data M are performed is set.

The reference destination data R further has a hash value of the control target file data managed by the content management data M as information for specifying the control target file data. In the example shown in FIG. 2, the reference destination data R has the hash value FileA of the control target file A and the hash value FileB of the control target file B. In an embodiment of the present invention, a case is described in which the information for specifying the control target file data is the hash value of the control target file data as a so-called whitelist, but alternatively the information may be the hash value of the non-control target file data as a blacklist.

According to information set as the information for specifying the control target file data, the identifier of the contract that manages the control target file is specified from the hash value of the control target file. For example, if the hash value of the control target file data managed by the contract is specified for the identifier of the contract of the reference destination data R, the identifier of the contract corresponding to the hash value of the control target file data is specified. If the hash value of the non-control target file data that is not managed by the contract is specified for the identifier of the contract of the reference destination data R, the route object data Obj including the hash value of the control target file data is specified first, and then, the identifier of the contract is specified from the reference destination data R corresponding to the specified route object data Obj.

Further, in an embodiment of the present invention, a case is described in which the reference destination data R includes the information for specifying the control target file data, and the identifier of the contract that manages the control target file data to be processed is specified based on the information for specifying the control target file data of the reference destination data R, but the present invention is not limited to this case. Even if the reference destination data R does not include the information for specifying the control target file data, the route object data Obj including the hash value of the control target file data to be processed may be specified, and the identifier of the contract may be specified from the reference destination data R in the specified route object data Obj.

The hash value is calculated from data of such route object data Obj, and the calculated hash value is used as the identifier of the route object data Obj. The hash value of the route object data Obj is associated with the identifier of the proprietor or the user of the content data managed by the content management data M in state data Bs of the blockchain data B.

As described above, in an embodiment of the present invention, the content management data M includes the control target file data or the non-control target file data that holds identifiers of the chunks divided from the content data, and the route object data Obj including the hash value of the control target file data or the non-control target file data. This can make it difficult to falsify the content management data M. Further, the route object data Obj holds the reference destination data R used for processing the information registered in the blockchain data B, and this enables the association of the content data to be managed with the information registered in the blockchain data B.

In an embodiment of the present invention, the state data Bs has identifiers of a plurality of contracts, and the route object data Obj is generated for each identifier of each contract. The proprietor terminal 1 may have a plurality of pieces of route object data Obj. In this case, a plurality of pieces of content data held by the proprietor terminal 1 are allocated to any of the pieces of route object data Obj.

(Proprietor Terminal)

The proprietor terminal 1 according to an embodiment of the present invention will be described with reference to FIG. 5. The proprietor terminal 1 is a general computer including a storage device 110, a processing device 120, and a communication control device 130. By the general computer executing a proprietor program, functions shown in FIG. 5 are realized.

The storage device 110 is a ROM (Read Only Memory), a RAM (Random Access Memory), a hard disk or the like, and stores various pieces of data such as input data, output data, and intermediate data required for the processing device 120 to perform processes. The processing device 120 is a CPU (Central Processing Unit), which reads and writes data stored in the storage device 110 and receives data from the communication control device 130 or outputs data to the communication control device 130 to perform processes of the proprietor terminal 1. The communication control device 130 is an interface through which the proprietor terminal 1 is communicably connected to terminals that belong to the blockchain network 5 or the file management network 8.

The storage device 110 stores the proprietor program and the content data held by the proprietor terminal 1, and also stores the blockchain data B, routing data 111 and the content management data M.

The blockchain data B is data of a blockchain that is synchronized with each terminal of the blockchain system 6 shown in FIG. 1. The blockchain data B is updated by a blockchain control unit 121.

In an embodiment of the present invention, the blockchain data B is for performing processes for the right of the content data according to Ethereum. The blockchain data B includes blockchain body data Bb and the state data Bs. The blockchain body data Bb is formed by connecting a plurality of blocks in a chain shape. Each block includes a plurality of transactions, and the contract may be set or the execution of the contract may be specified to the transactions. In the state data Bs, a data area is provided for each contract, and the data area of the contract is updated in response to the execution of the contract.

As shown in FIG. 6, in the state data Bs, the identifier of the contract for identifying the contract executed in the blockchain system 6, the hash value of the route object data Obj, and the control information on the content data managed by the contract are associated with one another. As described above with reference to FIG. 2, the route object data Obj is generated by the proprietor terminal 1 and includes data on the content data managed by the contract. The pieces of control information on the content data are the hash value of the control target file data for specifying the content data managed by the contract, an identifier of the proprietor in the blockchain system 6, an identifier of the proprietor and an identifier of the user of the content data in the file management system 9 and the like. The control information on the content data may further include conditions of a payment involved with the use or transfer of the content, the identifier of the user in the blockchain system 6 and the like.

Further, in an embodiment of the present invention, a case is described in which the state data Bs holds the hash value of the route object data Obj corresponding to the identifier of the contract, but the present invention is not limited to the case. The reference may be made appropriately, such as, for example, if the hash value of the route object data Obj is presented, the blockchain system 6 presents information on the route object data Obj, or if the identifier of the contract and the hash value of the route object data Obj are correctly presented, the blockchain system 6 presents the control information on the route object data Obj.

In an example shown in FIG. 6, a case is described in which identifiers of a single proprietor and a single user are set to a hash value of one piece of control target file data, but the present invention is not limited to this case. For example, identifiers of a plurality of proprietors and a plurality users may be set to a hash value of one piece of control target file data. In addition, the identifiers of the proprietor and the user may be set for various rights such as distribution rights and secondary use rights generated from rights and the use of the content data. If the user is not registered yet, a column of the identifier of the user is blank.

When the proprietor terminal 1 generates the route object data Obj, first, a contract linked to the route object data Obj to be generated is deployed in the blockchain data B. The route object data Obj is generated after the contract is deployed and the identifier of the contract is issued. The identifier of the deployed contract, the hash value of route object data Obj and the control information are set to the state data Bs in association with one another. As another method, the state data Bs or the like may be stored with table data in which a name of the contract is associated with the identifier of the contract. In this case, the proprietor terminal 1 generates the route object data Obj including the name of the contract, deploys the contract in association with the name of the contract, and associates the identifier of the deployed contract with the name of the contract in the table data.

In the routing data 111, identifiers of files in the file management system 9 are associated with identifiers of terminals that have files. Each terminal that belongs to the file management system 9 has the routing data 111. The identifiers of the files managed in the file management system 9, and the identifiers of the terminals that have the files are distributed and held in individual terminals. By integrating the pieces of routing data 111 of individual terminals, the identifiers of all of the files managed in the file management system 9 and the identifiers of the terminals that have the files can be specified.

As described with reference to FIG. 2, the content management data M is data for managing the content data registered in the file management system 9.

Although not shown in FIG. 5, the storage device 110 stores data necessary for the connection to the blockchain system 6 and the file management system 9. Specifically, the storage device 110 stores a secret key and a public key for electronic signature of the proprietor. In the blockchain system 6 and the file management system 9, different secret keys and public keys may be used, or alternatively, a common secret key and a common public key may be used.

The processing device 120 includes a blockchain control unit 121, a file management control unit 122, a route object generation unit 123, a sharing unit 124, and a transfer unit 125.

The blockchain control unit 121 gently synchronize the blockchain data B with blockchain data of another terminal and controls the blockchain data B so that the blockchain data B becomes data in the latest state nearly in real time. If a plurality of transactions are generated, the blockchain data B is updated after verifying whether it is allowable to add, to current blockchain body data Bb, a block in which the plurality of transactions are collected.

The file management control unit 122 registers content in the file management system 9 and manages the routing data 111 held by the proprietor terminal 1.

The route object generation unit 123 generates the route object data Obj of the content management data M shown in FIG. 2. The route object generation unit 123 deploys a contract that holds the control information on the content data to be managed in the blockchain data B, and generates the reference destination data R including an identifier of the contract. The reference destination data R also includes the information for specifying the control target file data managed by the route object data Obj.

The route object generation unit 123 further generates the route object data Obj including the reference destination data R, and the link names, the hash values and the like of the control target file data and the non-control target file data. The route object generation unit 123 stores the generated route object data Obj in the storage device 110 and registers, in the state data Bs, the hash value of the route object data Obj and the identifier of the deployed contract by associating the hash value and the identifier. More specifically, the route object generation unit 123 transmits, to the blockchain system 6, a transaction for associating the hash value of the route object data Obj with the identifier of the contract, and a terminal that processes this transaction updates the state data Bs by associating the hash value of the route object data Obj with the identifier of the contract.

After the route object generation unit 123 generates the route object data Obj, the file management control unit 122 notifies the terminals that belong to the file management system 9 of the hash value of the route object data Obj and the hash values of the control target file data and the non-control target file data by associating the has values with the identifier of the proprietor in the file management system 9. This notifies the terminals that belong to the file management system 9 that the proprietor holds the route object data Obj, and the control target file data and the non-control target file data managed by the route object.

The sharing unit 124 receives a request for use of the content data from the user, and after confirming that the user is a valid user, transmits the content data to the user. In this case, the user terminal 2 recognizes that the proprietor terminal 1 has the route object data Obj from the notification involved with the route object generation unit 123. The user terminal 2 specifies the hash value of the route object data Obj and acquires the route object data Obj from the proprietor terminal 1.

After receiving the use request including the hash value of the control target file data from the user terminal 2 via the file management system 9, the sharing unit 124 acquires, from state data Bs, the identifier of the contract of the reference destination data R corresponding to the hash value of the control target file data, and the identifier of the user in the file management system 9 associated with the hash value of the control target file data. For example, if the hash value of the control target file data A denoted with F1 is specified in the use request, and if the reference destination data R has the information for specifying the control target file data, the sharing unit 124 refers to the reference destination data R and specifies the identifier of the contract corresponding to the control target file data A denoted with F1 from the information for specifying the control target file data. Alternatively, if the reference destination data R does not include the information for specifying the control target file data, the sharing unit 124 specifies the route object data Obj including the hash value of the control target file data A denoted with F1, and specifies the identifier of the contract included in the reference destination data R of the specified route object data Obj. The sharing unit 124 acquires, from the state data Bs, the identifier of the specified contract and the identifier of the user associated with the hash value of the control target file data A denoted with F1.

If the identifier of the user acquired from the state data Bs matches the identifier of the user as a transmission source, the sharing unit 124 further transmits the content data specified by the control target file data to the user terminal 2 via the file management system 9. In this case, the content data is divided into chunks, and thus, the sharing unit 124 transmits the individual divided chunks to the user terminal 2. This enables the sharing unit 124 to provide the content data to the valid user registered in the state data Bs.

A case is described in which the proprietor terminal 1 confirms whether the identifier of the user registered in the state data Bs matches the identifier of the user as the transmission source, but the present invention is not limited to this case. For example, the proprietor terminal 1 may transmit, to the blockchain data B, the identifier of the user as the transmission source and the identifier of the contract. In this case, the contract of the blockchain data B confirms whether the identifier of the user registered in the state data Bs matches the identifier of the user transmitted from the proprietor terminal 1, and transmits back a result of the confirmation to the proprietor terminal 1.

The transfer unit 125 receives a request for transfer of the content data from a new proprietor, and after confirming that the new proprietor is a valid proprietor, transmits the content data to the proprietor, and after confirming that the proprietor has acquired the content data, deletes the content data. At a timing at which the request for transfer of the content data is received from the new proprietor, an identifier of the new proprietor is set in an identifier column of the proprietor of the control target file data of the state data Bs, and the content data is transferred from the proprietor (a former proprietor) to the new proprietor. The new proprietor terminal 3 recognizes that the proprietor terminal 1 has the route object data Obj from the notification involved with the route object generation unit 123, and then, specifies the hash value of the route object data Obj, and acquires the route object data Obj from the proprietor terminal 1.

After receiving a transfer request including the hash value of the control target file data from the new proprietor terminal 3 via the file management system 9, the transfer unit 125 acquires, from the state data Bs, the identifier of the proprietor in the file management system 9 associated with the identifier of the contract of the reference destination data R corresponding to the hash value of the control target file data and the hash value of the control target file data. For example, if the hash value of the control target file data A denoted with F1 is specified in the transfer request and the reference destination data R has the information for specifying the control target file data, the sharing unit 124 refers to the reference destination data R and specifies the identifier of the contract corresponding to the control target file data A denoted with F1 from the information for specifying the control target file data. Alternatively, if the reference destination data R does not include the information for specifying the control target file data, the transfer unit 125 specifies the route object data Obj including the hash value of the control target file data A denoted with F1, and specifies the identifier of the contract included in the reference destination data R of the specified route object data Obj. The transfer unit 125 acquires, from the state data Bs, the identifier of the proprietor associated with the identifier of the specified contract and the hash value of the control target file data A denoted with F1.

If the identifier of the proprietor acquired from the state data Bs matches the identifier of the new proprietor as a transmission source, the transfer unit 125 further transmits the content data specified by the control target file data to the new proprietor terminal 3 via the file management system 9. In this case, the content data is divided into chunks, and thus, the transfer unit 125 transmits the individual divided chunks to the new proprietor terminal 3. This enables the sharing unit to provide the content data to the valid user registered in the state data Bs.

After receiving the content data from the proprietor terminal 1, the new proprietor terminal 3 transmits, to the terminals that belong to the file management system 9, a notification that the new proprietor terminal 3 has the content data. The transfer unit 125 deletes the content data from the storage device 110 after receiving, from the new proprietor terminal 3, the notification that the new proprietor terminal 3 has the content data. This can avoid a state in which the former proprietor who has no right of the content data holds the content data.

A case is described in which the proprietor terminal 1 confirms whether the identifier of the proprietor registered in the state data Bs matches the identifier of the new proprietor as the transmission source, but the present invention is not limited to the case. For example, the proprietor terminal 1 may transmit, to the blockchain data B, the identifier of the new proprietor as the transmission source and the identifier of the contract. In this case, the contract of the blockchain data B confirms whether the identifier of the proprietor registered in the state data Bs matches the identifier of the new proprietor transmitted from the proprietor terminal 1, and transmits back a result of the confirmation to the proprietor terminal 1.

When the proprietor terminal 1 generates the route object data Obj, the proprietor terminal 1 may also notify terminals of the identifiers of the chunks of the content data specified by the control target file that is managed by the generated route object data Obj by associating the identifiers with the identifier of the proprietor in the file management system 9. After receiving an acquisition request in which the identifiers of the chunks are specified, the proprietor terminal 1 specifies the control target file data linked with the identifiers of the chunks, and confirms the user of the control target file data specified from the blockchain data B. The proprietor terminal 1 transmits the chunks specified in the acquisition request if the request is from a valid user.

Further, the identifiers of the chunks are grouped in the DAG, and thus, there is a case where the control target file data does not include the identifiers of the chunks specified in the acquisition request. Even in this case, chunks including the identifiers of the chunks specified in the acquisition request may be searched from the individual chunks whose identifiers are included in the control target file data of the route object data Obj that is held by the proprietor terminal 1. Alternatively, the proprietor terminal 1 may hold a table in which hash values of each control target file data and the non-control target file data managed by the route object data Obj is associated with identifiers of individual chunks of each control target file data and the non-control target file data. Accordingly, even if the proprietor terminal 1 receives an acquisition request for a chunk, the proprietor terminal 1 can easily specify, from the identifiers of the chunks, a hash value of the control target file data corresponding to the chunk, and can confirm the identifier of the user of the specified control target file in the state data Bs.

(User Terminal)

With reference to FIG. 7, the user terminal 2 according to an embodiment of the present invention will be described. The user terminal 2 is a general computer including a storage device 210, a processing device 220, and a communication control device 230. By the general computer executing the proprietor program, functions shown in FIG. 7 are realized.

The storage device 210 is a ROM (Read-Only Memory), a RAM (Random-Access Memory), a hard disk or the like, and stores various pieces of data such as input data, output data, and intermediate data required for the processing device 220 to perform processes. The processing device 220 is a CPU (Central Processing Unit) which reads and writes data stored in the storage device 210, and receives data from the communication control device 230 or outputs data to the communication control device 230 to perform processes in the user terminal 2. The communication control device 230 is an interface through which the user terminal 2 is communicably connected with terminals that belong to the blockchain network 5 or the file management network 8.

The storage device 210 stores a user program and also stores the blockchain data B and routing data 211.

The blockchain data B and the routing data 211 are similar to the blockchain data B and the routing data 111 described with reference to FIG. 5.

Although not shown in FIG. 7, the storage device 210 stores data necessary for the connection to the blockchain system 6 and the file management system 9. Specifically, the storage device 210 stores a secret key and a public key for electronic signature of the user. In the blockchain system 6 and the file management system 9, different secret keys and public keys may be used, or alternatively a common secret key and a common public key may be used.

The processing device 220 includes a blockchain control unit 221, a file management control unit 222, and a use unit 223.

The blockchain control unit 221 and the file management control unit 222 function similarly to the blockchain control unit 121 and the file management control unit 122 described with reference to FIG. 5.

When using the content data held by the proprietor, the use unit 223 registers, in the state data Bs, a feature that the use unit 223 is a user, and also acquires the content data from the proprietor terminal 1 to use the content data.

After registering the hash value of the route object data Obj in the state data Bs, the proprietor terminal 1 notifies the terminals that belong to the file management system 9 of the hash value of the route object data Obj and the hash values of the control target file data and the non-control target file data by associating the hash values with the identifier of the proprietor in the file management system 9. Accordingly, the user terminal 2 recognizes that the proprietor terminal 1 has the route object data Obj, specifies the hash value of the route object data Obj, and acquires the route object data Obj from the proprietor terminal 1.

If the use unit 223 becomes a user of the content data specified by the control target file data, the use unit 223 transmits a transaction for setting the identifier of the user to the blockchain system 6. The transaction specifies the identifier of the contract of the reference destination data R corresponding to the hash value of the control target file data and the hash value of the control target file data. At this time, the transaction is generated based on the call information on the contract of the reference destination data R. Accordingly, the identifier of the user of the control target file in the state data Bs is set. If the reference destination data R includes the information for specifying the control target file data, the use unit 223 acquires the identifier of the contract corresponding to the hash value of the control target file data to be used in the reference destination data R. Alternatively, if the reference destination data R does not include the information for specifying the control target file data, the use unit 223 acquires the identifier of the contract of the reference destination data R in the route object data Oj including the hash value of the control target file data to be used.

The use unit 223 acquires, from the state data Bs, the identifier of the proprietor associated with the identifier of the contract of the reference destination data R corresponding to the hash value of the control target file data and the hash value of the control target file data. This makes the use unit 223 recognize the identifier of the proprietor in the file management system 9 of the content data specified by the control target file data.

The use unit 223 further transmits, to the proprietor terminal 1, a use request including the hash value of the control target file data via the file management system 9. The use unit 223 receives the content data via the file management system 9. The content data is divided into chunks, and thus, the use unit 223 receives the individual divided chunks from the proprietor terminal 1. The use unit 223 can acquire the content data from the valid proprietor registered in the state data Bs.

(New Proprietor Terminal)

The new proprietor terminal 3 according to an embodiment of the present invention will be described with reference to FIG. 8. The new proprietor terminal 3 is a general computer including a storage device 310, a processing device 320, and a communication control device 330. By the general computer executing a new proprietor program, functions shown in FIG. 8 are realized.

The storage device 310 is a ROM (Read-Only Memory), a RAM (Random-Access Memory), a hard disk or the like, and stores various pieces of data such as input data, output data, and intermediate data that are required for the processing device 320 to perform processes. The processing device 320 is a CPU (Central Processing Unit) which reads and writes data stored in the storage device 310 and receives data from the communication control device 330 or outputs data to the communication control device 330 to perform processes in the new proprietor terminal 3. The communication control device 330 is an interface through which the new proprietor terminal 3 is communicably connected to terminals that belong to the blockchain network 5 or the file management network 8.

The storage device 310 stores a new proprietor program, and also stores blockchain data B and routing data 311.

The blockchain data B and the routing data 311 are similar to the blockchain data B and the routing data 311 described with reference to FIG. 5.

Although not shown in FIG. 8, the storage device 310 stores data necessary for the connection to the blockchain system 6 and the file management system 9. Specifically, the storage device 310 stores a secret key and a public key for electronic signature of the user. In the blockchain system 6 and the file management system 9, different secret keys and public keys may be used, or alternatively, a common secret key and a common public key may be used.

The processing device 320 includes a blockchain control unit 321, a file management control unit 322, and a transfer request unit 323.

The blockchain control unit 321 and the file management control unit 322 function similarly to the blockchain control unit 121 and the file management control unit 122 described with reference to FIG. 5.

The transfer request unit 323 registers, in the state data Bs, a feature that the right of the content data held by a proprietor (a former proprietor) has been transferred from the proprietor to a new proprietor, and acquires the content data from the proprietor terminal 1.

After registering the hash value of the route object data Obj in the state data Bs, the proprietor terminal 1 notifies the terminals that belong to the file management system 9 of the hash value of the route object data Obj and the hash values of the control target file data and the non-control target file data by associating the hash values with the identifier of the proprietor in the file management system 9. Accordingly, the new proprietor terminal 3 recognizes that the proprietor terminal 1 has the route object data Obj, specifies the hash value of the route object data Obj, and acquires the route object data Obj from the proprietor terminal 1.

If the terminal becomes the proprietor of the content data specified by the control target file data, the transfer request unit 323 acquires, from the state data Bs, the identifier of the proprietor (the former proprietor) associated with the identifier of the contract of the reference destination data R corresponding to the hash value of the control target file data and the hash value of the control target file data. This makes the use unit 223 recognize the identifier of the former proprietor in the file management system 9 of the content data specified by the control target file data. If the reference destination data R includes the information for specifying the control target file data, the transfer request unit 323 acquires the identifier of the contract corresponding to the hash value of the control target file data to be transferred in the reference destination data R. Alternatively, if the reference destination data R does not include the information for specifying the control target file data, the use unit 223 acquires the identifier of the contract of the reference destination data R in the route object data Oj including the hash value of the control target file data to be transferred.

The transfer request unit 323 further transmits, to the blockchain system 6, a transaction for changing the identifier of the proprietor of the control target file data to an identifier of the new proprietor. In this transaction, the identifier of the contract of the reference destination data R corresponding to the hash value of the control target file data and the hash value of the control target file data are specified. At this time, the transaction is generated based on call information on the contract of the reference destination data R. This causes the identifier of the proprietor of the control target file in the state data Bs to be changed from the identifier of the former proprietor to the identifier of the new proprietor.

The transfer request unit 323 further transmits, to the proprietor terminal 1, the transfer request including the hash value of the control target file data via the file management system 9, and receives the content data via the file management system 9. The content data is divided into chunks, and thus, the transfer request unit 323 receives the individual divided chunks from the proprietor terminal 1. This enables the use unit 223 to acquire the content data from the valid proprietor registered in the state data Bs.

At this time, the file management control unit 322 transmits a notification that the new proprietor terminal 3 has the content data to the proprietor terminal 1. After receiving the notification, the proprietor terminal 1 deletes the content data. This can avoid a state where the former proprietor who has no right of the content data holds the content data.

Processes according to an embodiment of the present invention will be described with reference to FIGS. 9 to 11B. The order of the processes shown in FIGS. 9 to 11B is merely an example, and the present invention is not limited to the order. The processes of the blockchain data B are performed by any terminal in the blockchain system 6. The processes of the blockchain data B are processes to be performed by the terminals that belong to the blockchain system 6. The processes of the file management system 9 are processes to be performed by terminals that belong to the file management system 9.

(Generation and Registration of Route Object Data)

Figure 9:
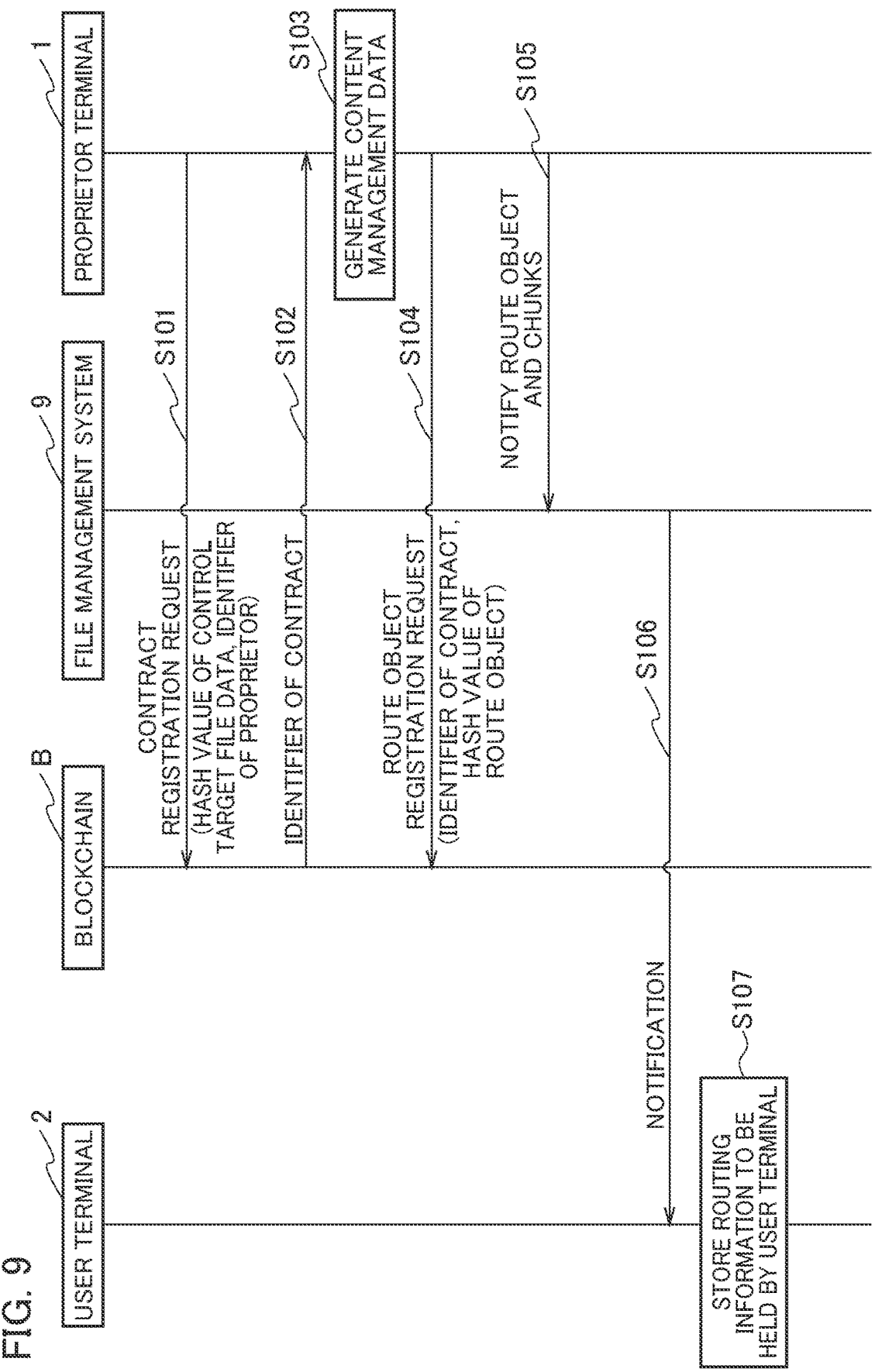
FIG. 9 is a sequence diagram for explaining processes of a proprietor terminal generating route object data and registering the route object data in a file management system in a content use system according to an embodiment of the present invention.

With reference to FIG. 9, processes for the proprietor terminal 1 to generate the route object data Obj and register the data in the file management system 9 will be described.

In step S101, the proprietor terminal 1 issues a transaction for registering a contract that manages the control information on the content data, together with the hash value of the control target file data that specifies the content data and the identifier of the proprietor in the file management system 9. The blockchain data B is registered with the contract and also issues the identifier of the contract. Further, the blockchain data B associates the identifier of the contract, the hash value of the control target file data, and the identifier of the proprietor in the file management system 9 with one another, and stores the associated identifiers and hash values in the state data Bs. In step S102, the blockchain data B transmits the identifier of the contract registered in the blockchain data B to the proprietor terminal 1.

In step S103, the proprietor terminal 1 generates the content management data M. The proprietor terminal 1 generates the reference destination data R set with the identifier of the contract. The proprietor terminal 1 further generates the route object data Obj including the generated reference destination data and the link names and the hash values of the control target file data and the non-control target file data managed by the route object data Obj. In step 104, the proprietor terminal 1 issues a transaction for associating the hash value of the route object data Obj with the identifier of the contract and registering the associated identifier and hash value.

In step S105, the proprietor terminal 1 notifies the file management system 9 that the proprietor terminal has the route object data Obj and the chunks of the content data. In step S106, the notification is transmitted to the user terminal 2. In step S107, the user terminal 2 updates the routing data 211 if routing information which needs to be held by the user terminal 2 is present based on the notification content.

(Sharing of Content Data)

Figure 10A:
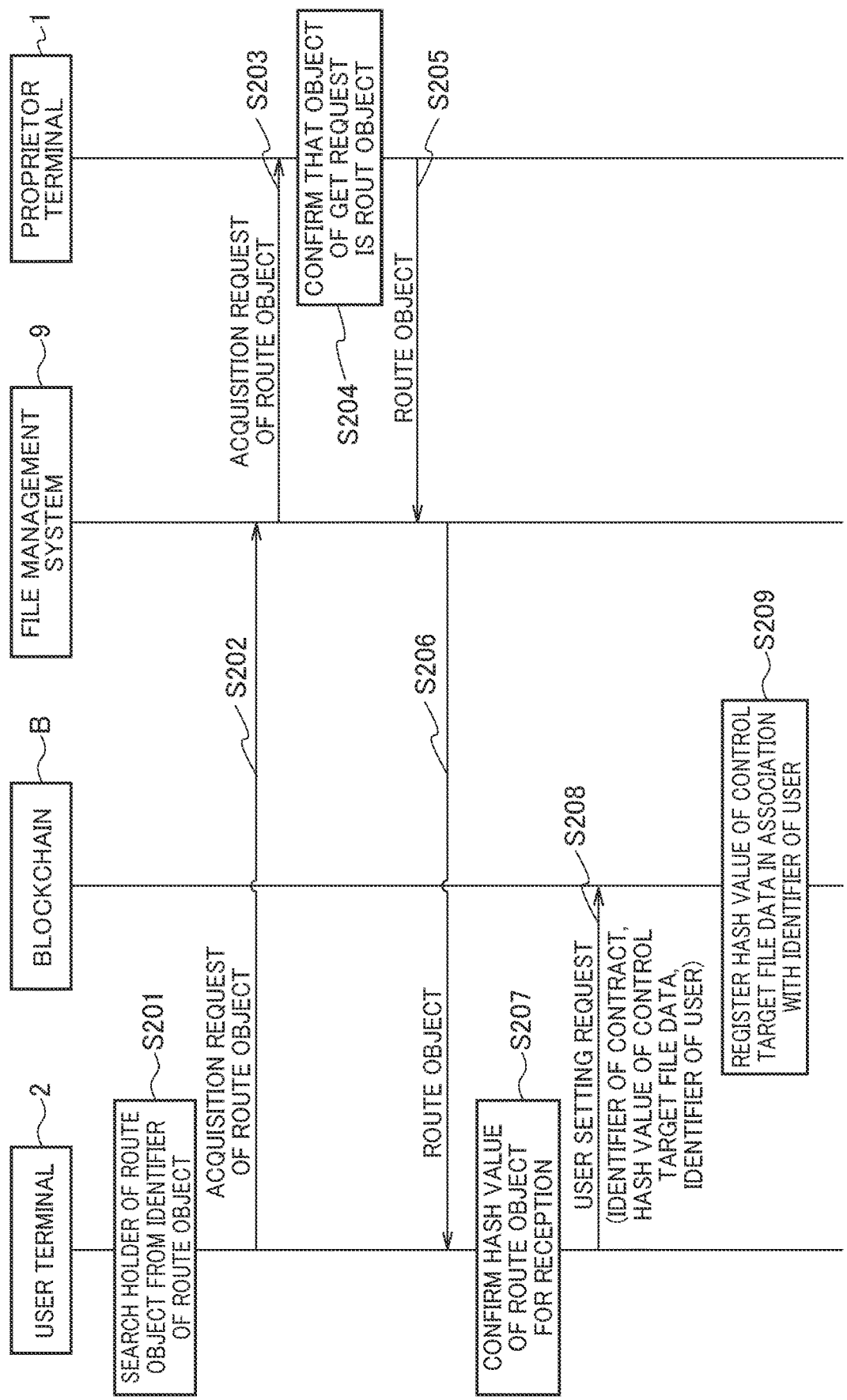
FIG. 10A is a sequence diagram for explaining processes of a user terminal requesting sharing of content data to a proprietor terminal in a content use system according to an embodiment of the present invention (Part 1).
Figure 10B:
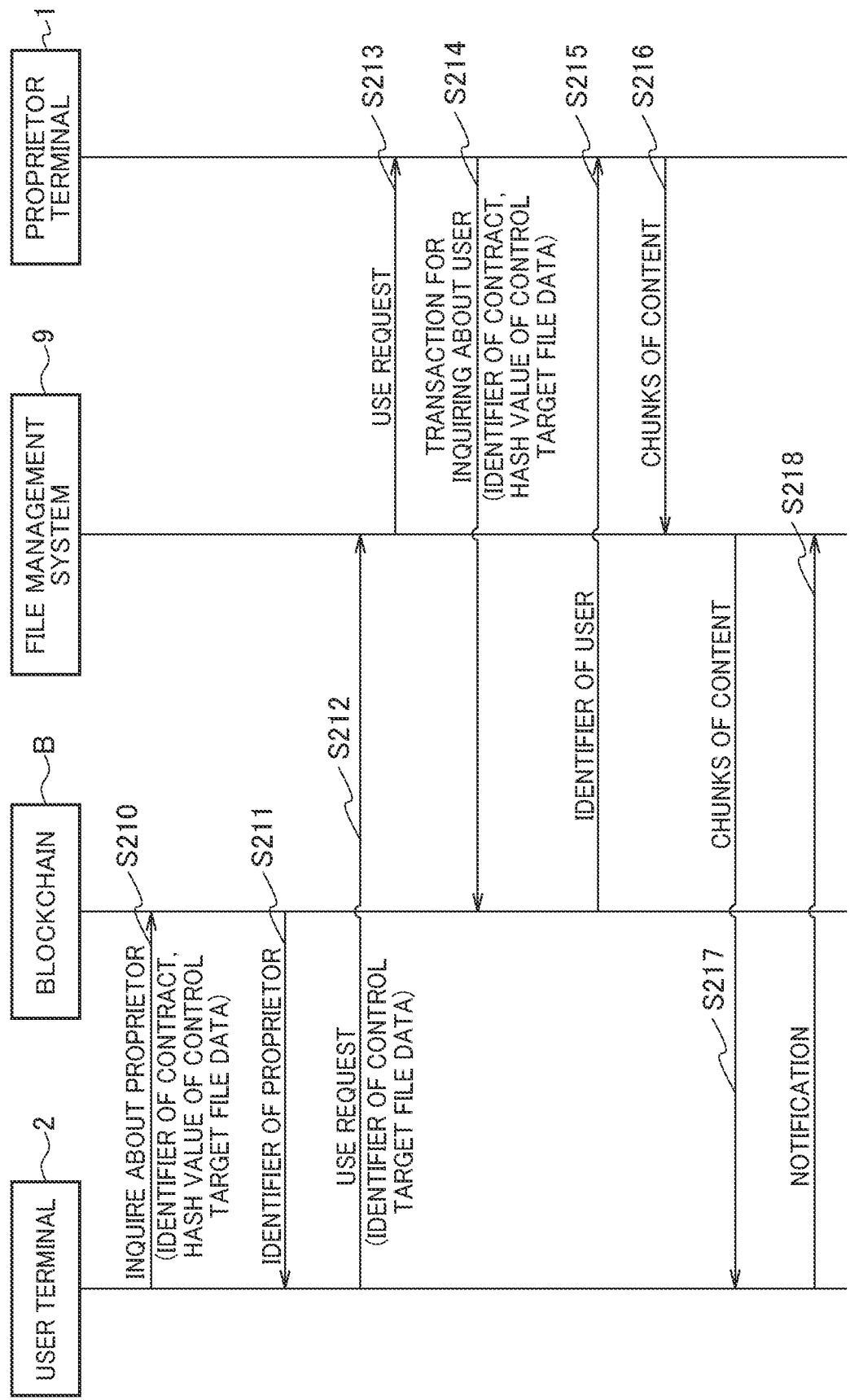
FIG. 10B is a sequence diagram for explaining processes of a user terminal requesting sharing of content data to a proprietor terminal in a content use system according to an embodiment of the present invention (Part 2).

With reference to FIGS. 10A and 10B, in an embodiment of the present invention, processes of the user terminal 2 requesting the sharing of the content data to the proprietor terminal 1 will be described.

In step S201, the user terminal 2 searches a holder terminal of the route object data Obj from the hash value of the route object data Obj corresponding to the control target file data to be used. Each terminal that belongs to the file management system 9 has a list of pieces of data held by the terminals in the file management system 9, and thus, the user terminal 2 inquires about a holder terminal of the route object data Obj to the terminals in the file management system 9. A holder terminal of the route object data Obj is the proprietor terminal 1, and thus, in step 202, the user terminal 2 transmits, to the file management system 9, a request to acquire the route object data Obj specifying the hash value of the route object data Obj. In step S203, the request to acquire the route object data Obj is transmitted to the proprietor terminal 1.

In step S204, the proprietor terminal 1 specifies the route object data Obj as an acquisition request target. The proprietor terminal 1 confirms that the hash value calculated from the route object data Obj corresponds to the hash value of the route object data Obj included in the acquisition request. In step S205, the user terminal 2 transmits the route object data Obj to the file management system 9. In step S206, the route object data Obj is transmitted to the user terminal 2.

In step S207, the user terminal 2 first confirms that the transmitted route object data Obj is a desired route object data Obj, and then receives the transmitted route object data Obj. For example, the user terminal 2 confirms that the hash value of the route object data Obj included in the acquisition request is the hash value calculated from the received route object data Obj.

The user terminal 2 registers an identifier of the user terminal 2 in the blockchain data B as the user of the control target file data. Specifically, the user terminal 2 specifies the identifier of the contract corresponding to the control target file data from the route object data Obj. In step S208, the user terminal 2 specifies the identifier of the contract, the hash value of the control target file data, and the identifier of the user in the file management system 9, and transmits a transaction for requesting the setting of the user. In step S209, the identifier of the user of the blockchain data B is set.

In step S210, the user terminal 2 specifies the identifier of the contract and the hash value of the control target file data, and inquires about the proprietor of the control target file data to for the blockchain data B. In step S211, the user terminal 2 acquires the identifier of the proprietor in the file management system 9 for the control target file data.

In step S212, the user terminal 2 specifies the hash value of the control target file data and transmits the use request to the file management system 9. In step S213, the use request is transmitted to the proprietor terminal 1. The hash value of the route object data Obj may be set to the use request such that the identifier of the content can be easily specified in the proprietor terminal 1.

The proprietor terminal 1 specifies, from route object data Obj of the proprietor terminal 1, the identifier of the contract associated with the hash value of the control target file data that is specified in the use request. In step S214, the proprietor terminal 1 specifies the identifier of the specified contract and the hash value of the control target file data included in the use request for the blockchain data B, and inquires about the identifier of the user of the control target file data. In step S215, the proprietor terminal 1 acquires the identifier of the user.

If the identifier of the user acquired in step S215 matches the identifier of the user terminal which has transmitted the use request in step S213, in step S216, the proprietor terminal 1 transmits, to the file management system 9, the chunks of content data specified by the control target file data. The chunks of the content data specified by the control target file data are transmitted to the user terminal 2 in step S217.

In step S218, the user terminal 2 notifies the file management system 9 that the user terminal 2 has the chunks of the content data specified by the control target file data specified in the use request in step S212.

(Transfer of Right of Content Data)

Figure 11A:
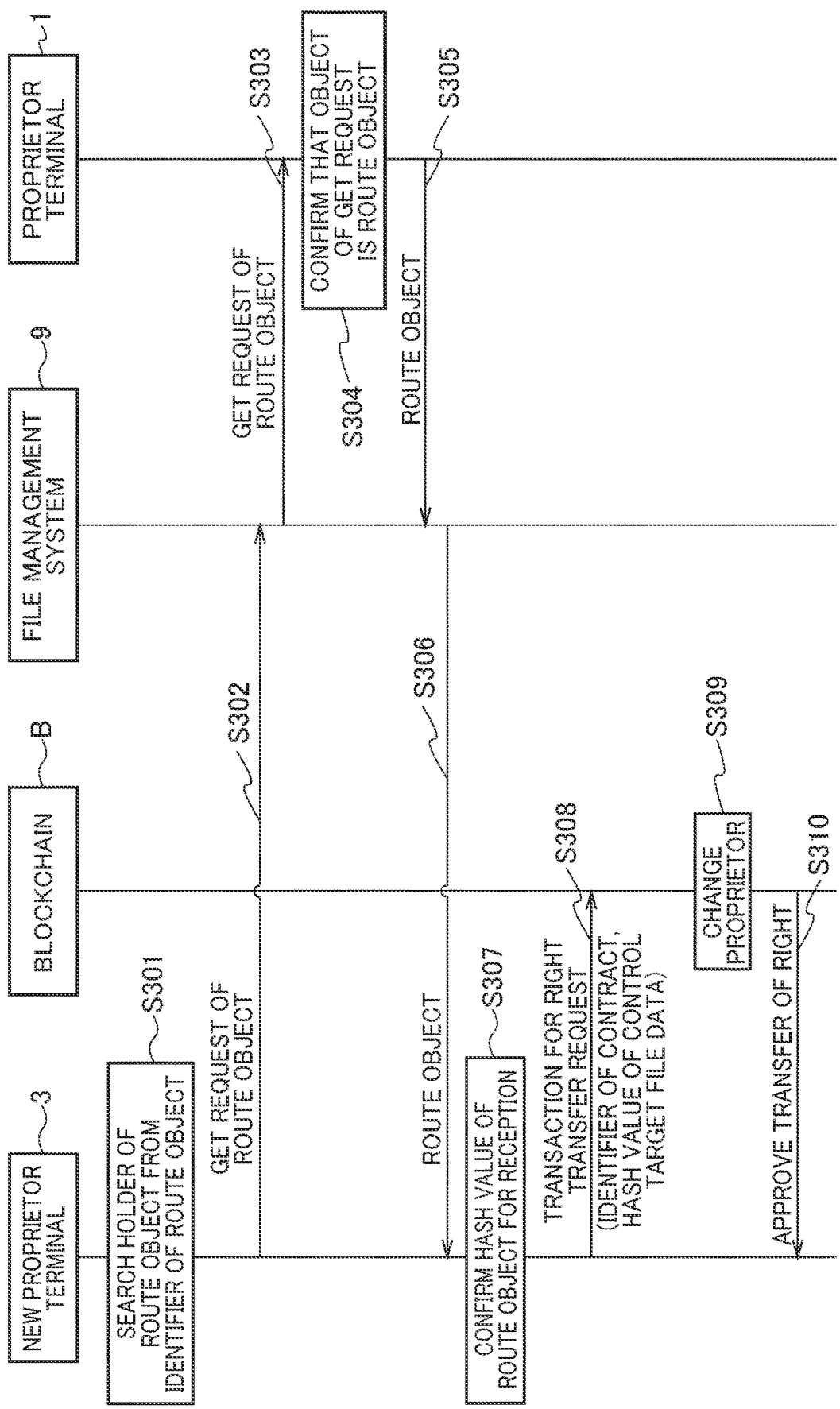
FIG. 11A is a sequence diagram for explaining processes of a new proprietor terminal requesting transfer of content data to a proprietor terminal in a content use system according to an embodiment of the present invention (Part 1).
Figure 11B:
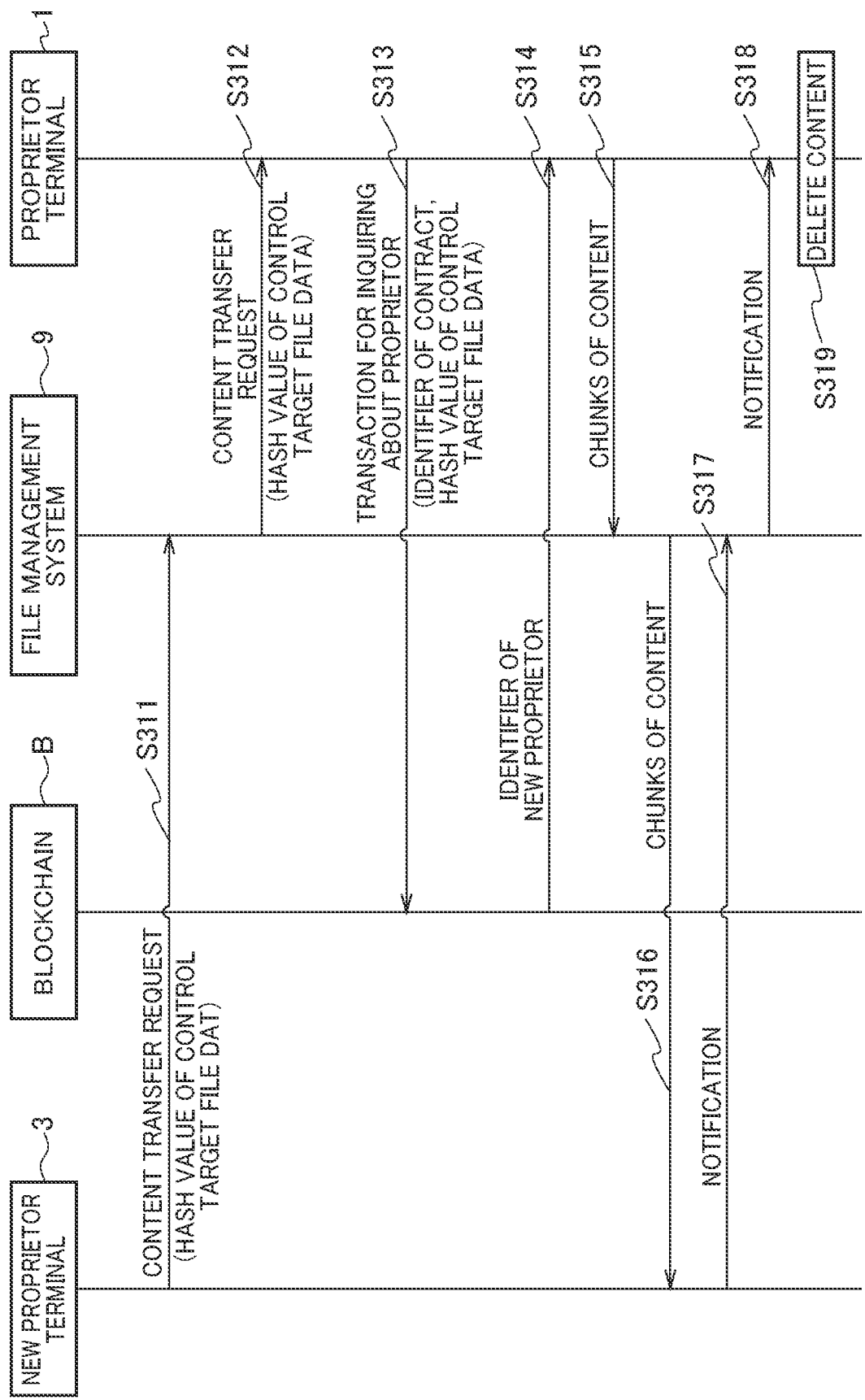
FIG. 11B is a sequence diagram for explaining processes of a new proprietor terminal requesting transfer of content data to a proprietor terminal in a content use system according to an embodiment of the present invention (Part 2).

With reference to FIGS. 11A and 11B, in an embodiment of the present invention, processes of the new proprietor terminal 3 requesting the transfer of the content data to the proprietor terminal 1 will be described.

By performing processes of steps S301 to S307, the new proprietor terminal 3 acquires the route object data Obj related to the control target file data corresponding to the content data to be transferred. The processes are similar to the processes of steps S201 to S207 of FIG. 10A.

The new proprietor terminal 3 registers an identifier of the new proprietor terminal 3 in the blockchain data B as the proprietor of the control target file data. Specifically, the new proprietor terminal 3 specifies the identifier of the contract corresponding to the control target file data from the route object data Obj. In step S308, the new proprietor terminal 3 specifies the identifier of the contract, the hash value of the control target file data, and the identifier of the new proprietor in the file management system 9, and transmits a transaction for requesting the setting of the proprietor. In step S309, the identifier of the new proprietor is set as the identifier of the proprietor of the blockchain data B. After a feature that the right is transferred to the new proprietor is registered in the blockchain data B, the new proprietor terminal 3 is notified about the transfer of the right in step S310.

Although not shown, the new proprietor terminal 3 may acquire the identifier of the former proprietor of the control target file data. Further, for the transfer of the right, various processes are considered depending on specifications of the contract. For example, processes are conceivable in which the blockchain data B inquires, to the proprietor terminal 1, whether it is possible to transfer the right, and sets the identifier of the new proprietor if the proprietor terminal 1 responds that the transfer of the right is allowed.

In step S311, the new proprietor terminal 3 specifies the hash value of the control target file data and transmits the transfer request to the file management system 9. The transfer request is transmitted to the proprietor terminal 1 in step S312. The hash value of the route object data Obj may be set to the transfer request so that the proprietor terminal 1 can easily specify the identifier of the content.

The proprietor terminal 1 specifies the identifier of the contract associated with the hash value of the control target file data specified in the transfer request. In step S313, the proprietor terminal 1 specifies the identifier of the specified contract and the hash value of the control target file data included in the transfer request for the blockchain data B, and inquires, to the blockchain data B, the identifier of the proprietor of the control target file data. In step S314, the proprietor terminal 1 acquires the identifier of the proprietor.

If, in step S314, the acquired identifier of the proprietor matches the identifier of the terminal that has transmitted the transfer request in step S312, in step S315, the proprietor terminal 1 transmits, to the file management system 9, the chunks of the content data specified by the control target file data. In step S316, the chunks of the content data specified by the control target file data are transmitted to the new proprietor terminal 3.

The new proprietor terminal 3 notifies the file management system 9 that the new proprietor terminal 3 has the chunks of the content data specified by the control target file data specified in the transfer request in step S317.

After receiving the notification in step S318, the proprietor terminal 1 deletes, from the storage device 110, the content data specified by the control target file data in step S319.

In the content use system 10 according to an embodiment of the present invention, the content data is divided in units of route object data and is managed, and the contracts in the blockchain data B are allocated for each route object data. Accordingly, even if a bug of the contract or an attack against the contract occurs, the content data managed by another contract is not affected.

In an embodiment of the present invention, the identifiers of the chunks are stored in the proprietor terminal 1 without being registered in the blockchain data B and are distributed when necessary. Accordingly, the bloating of the blockchain data B can be prevented, and the improvement in a cost required for the transaction processes and the throughput of the transaction can be expected.

Further, even if the identifier of the chunk is not registered in the blockchain data B, the data of the chunk can be provided to the valid proprietor for a request for each chunk by referring to the control information registered in the blockchain data B. Specifically, the identifier of the chunk of content data specified by the control target file data can be traced from the route object data Obj. Therefore, even if a request is made by specifying the identifier of the chunk, the identifier of the user or the like of the content data specified by the control target file data can be specified from the identifier of the chunk. Further, by holding a table in which the identifier of the chunk is associated with the hash value of the control target file data related to the chunk, the control target file data corresponding to the identifier of the chunk can be specified from the route object data Obj even if the identifier of the desired chunk is not traced. In this way, the chunk can be distributed to an appropriate user.

As described above, in the content use system 10 according to an embodiment of the present invention, the information on the content registered in the file management system 9 can be distributed and registered in the blockchain.

Modified Example

Figure 12:
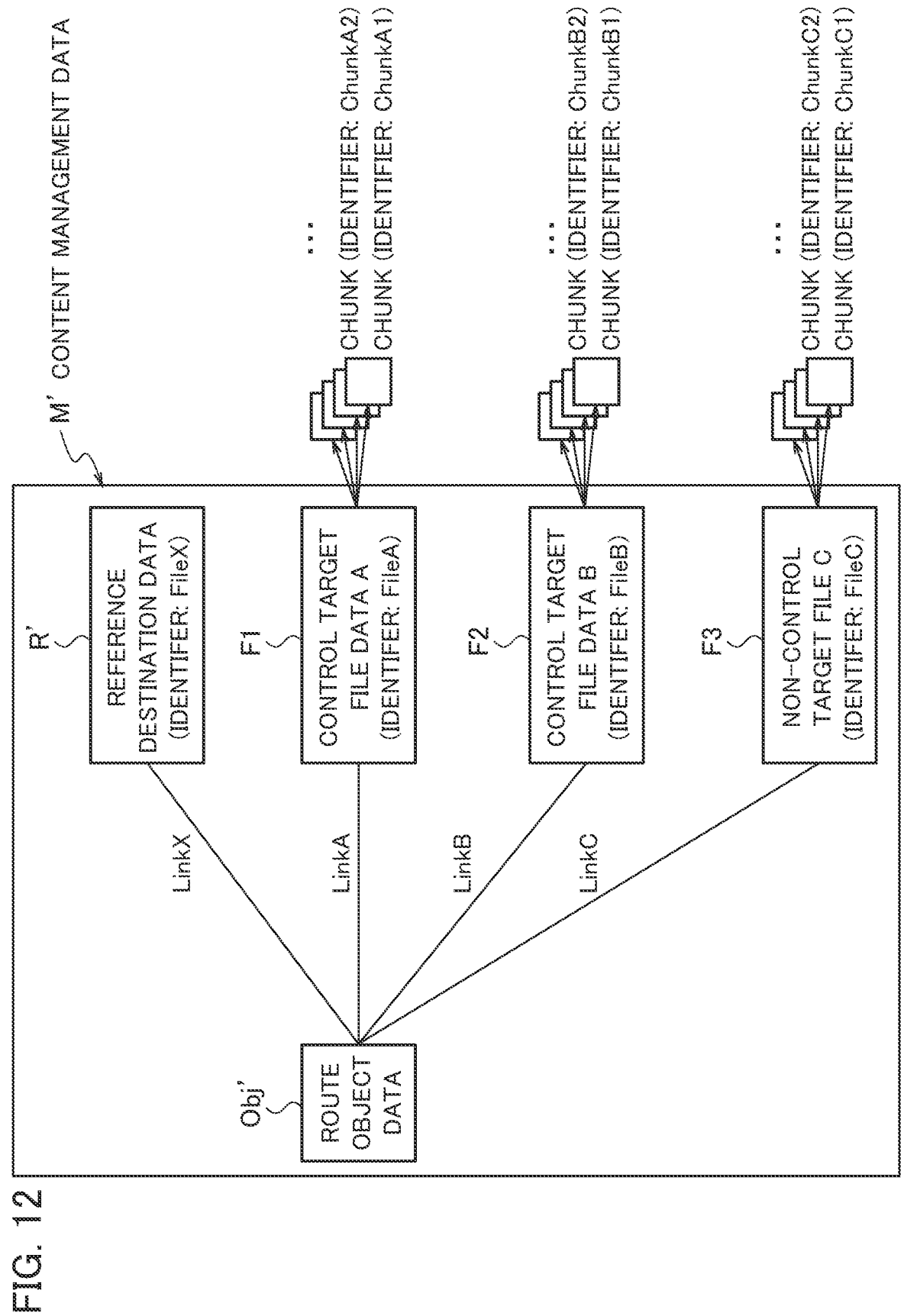
FIG. 12 is a diagram for explaining content management data used in a content use system according to a modified example.

As shown in FIG. 2, in the content management data M according to an embodiment of the present invention, the reference destination data R is included in the route object data Obj, but the present invention is not limited thereto. For example, in content management data M' shown in FIG. 12, route object data Obj' does not include reference destination data R'. As shown in FIG. 13, the route object data Obj' includes link names LinkX and hash values FileX of the reference destination data R' in addition to the link names and the hash values of the control target file data and the non-control target file data managed by the route object data Obj.

While, in an embodiment of the present invention, the user terminal 2 or the new proprietor terminal 3 acquires the route object data Obj, in a modified example, the user terminal 2 or the new proprietor terminal 3 acquires the route object data Obj' and the reference destination data R'. The storage device of the user terminal 2 or the new proprietor terminal 3 stores the route object data Obj' including the link names and the hash values of the reference destination data R', and the reference destination data R' instead of including the reference destination data R'.

(Sharing of Content Data)

Figure 14A:
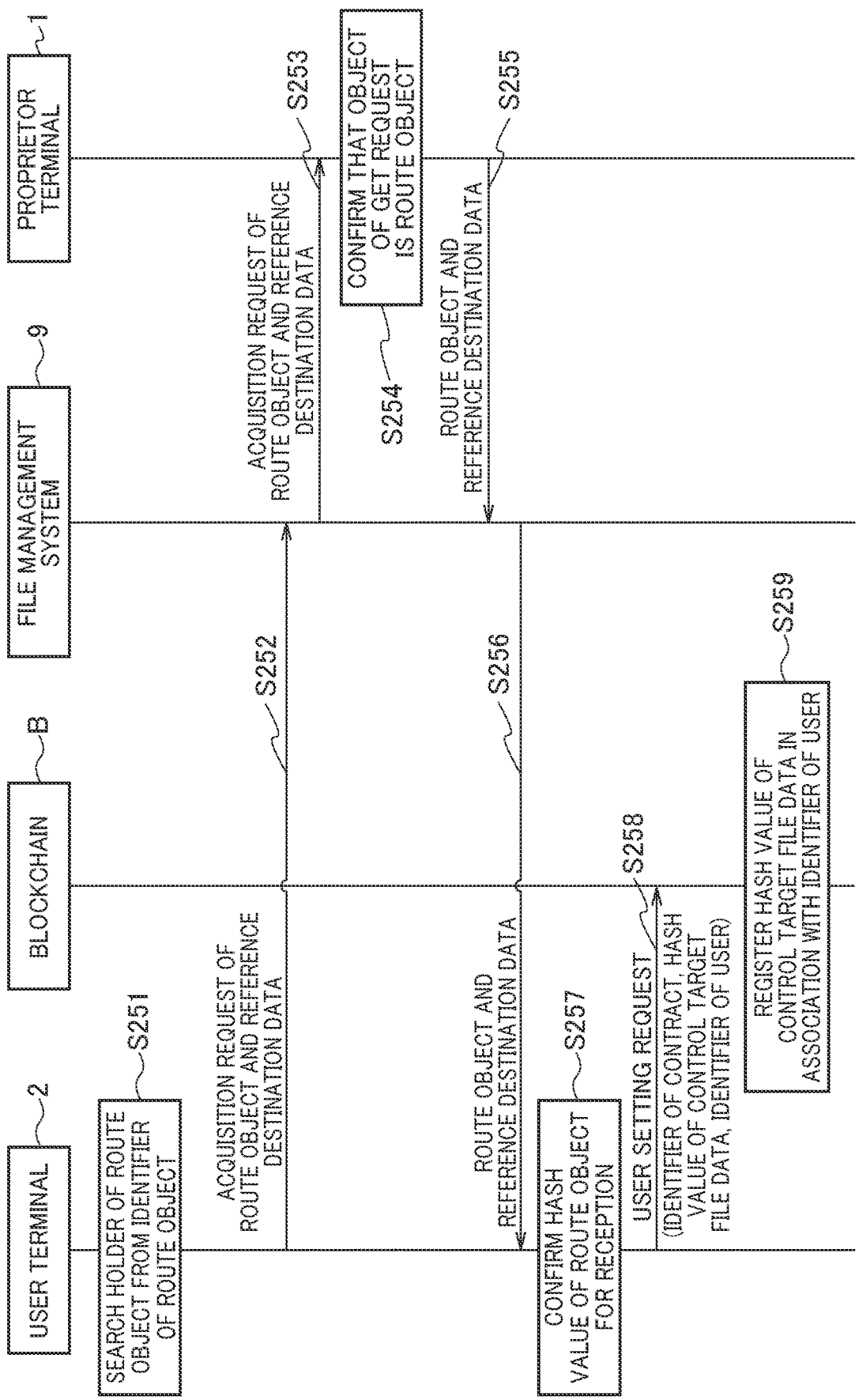
FIG. 14A is a sequence diagram for explaining processes of a user terminal requesting sharing of content data to a proprietor terminal in a content use system according to a modified example (Part 1).
Figure 14B:
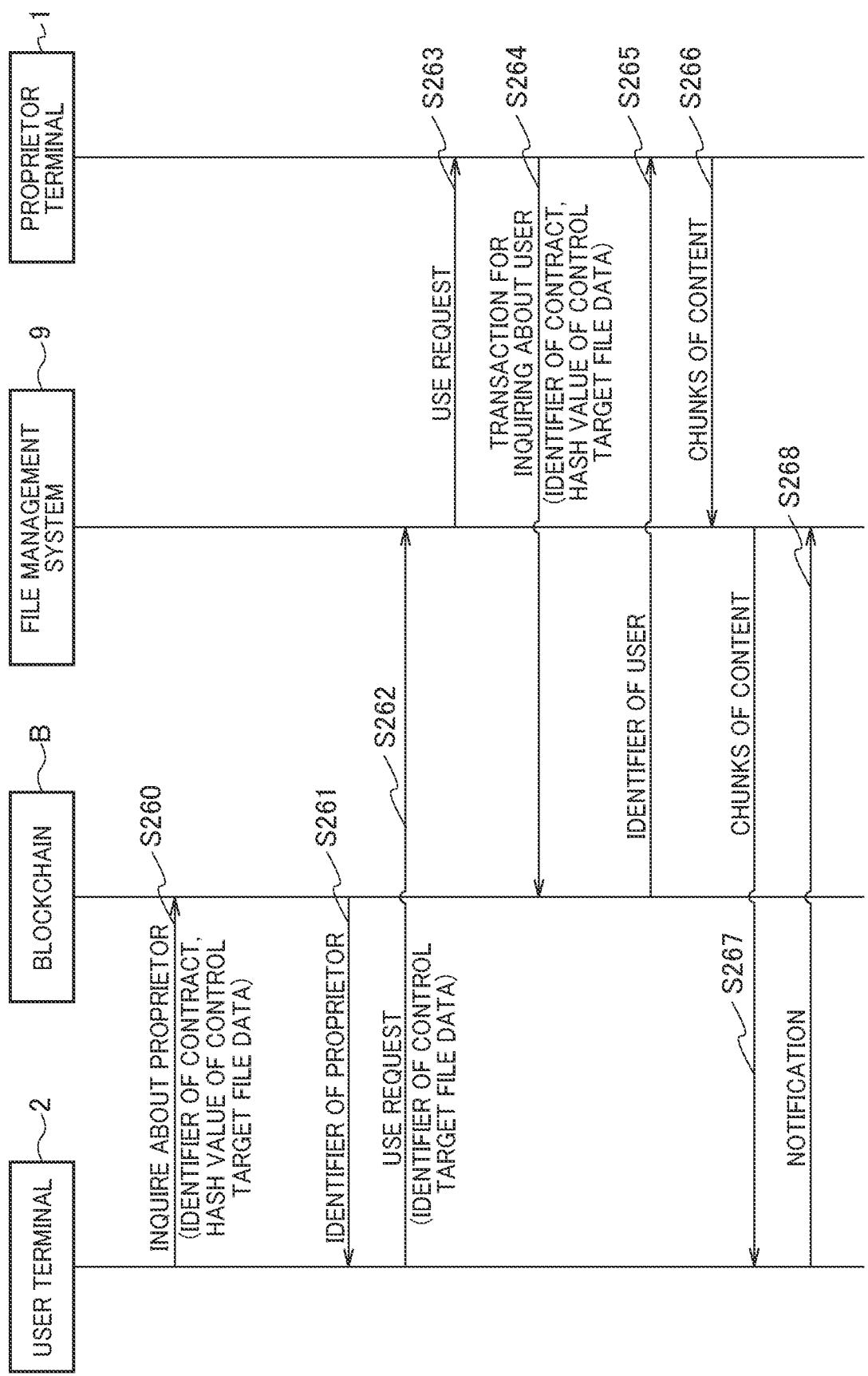
FIG. 14B is a sequence diagram for explaining processes of a user terminal requesting sharing of content data to a proprietor terminal in a content use system according to a modified example (Part 2).

With reference to FIGS. 14A and 14B, processes of the user terminal 2 requesting the sharing of the content data to the proprietor terminal 1 in a modified example will be described.

In step S251, the user terminal 2 searches a holder terminal of the route object data Obj' from the hash value of the route object data Obj' corresponding to the control target file data to be used. Each terminal that belongs to the file management system 9 has a list of pieces of data held by the terminals in the system, and thus, the user terminal 2 inquires about a holder terminal of the route object data Obj' to the terminals in the file management system 9. A holder terminal of the route object data Obj' is the proprietor terminal 1, and thus, in step S252, the user terminal 2 specifies the hash value of the route object data Obj' and transmits, to the file management system 9, a request for acquiring the route object data Obj' and the reference destination data R'. In step S253, the request for acquiring the route object data Obj' is transmitted to the proprietor terminal 1.

In step S254, the proprietor terminal 1 specifies the route object data Obj as the acquisition request target. The proprietor terminal 1 confirms that the hash value of the route object data Obj' corresponds to the hash value calculated from the route object data Obj included in the acquisition request. In step S255, the user terminal 2 transmits, to the file management system 9, the route object data Obj' and the reference destination data R'. In step 256, the route object data Obj' and the reference destination data R' are transmitted to the user terminal 2.

In step S257, the user terminal 2 first confirms that the transmitted route object data Obj' and reference destination data R' are desired route object data and reference destination data, and then receives the route object data Obj' and reference destination data R'. For example, the user terminal 2 confirms that the hash value of the route object data Obj' included in the acquisition request matches the hash value calculated from the received route object data Obj'.

Processes at or after step S258 are similar to the processes at or after step S208 in FIG. 10A.

(Transfer of Right of Content Data)

Figure 15B:
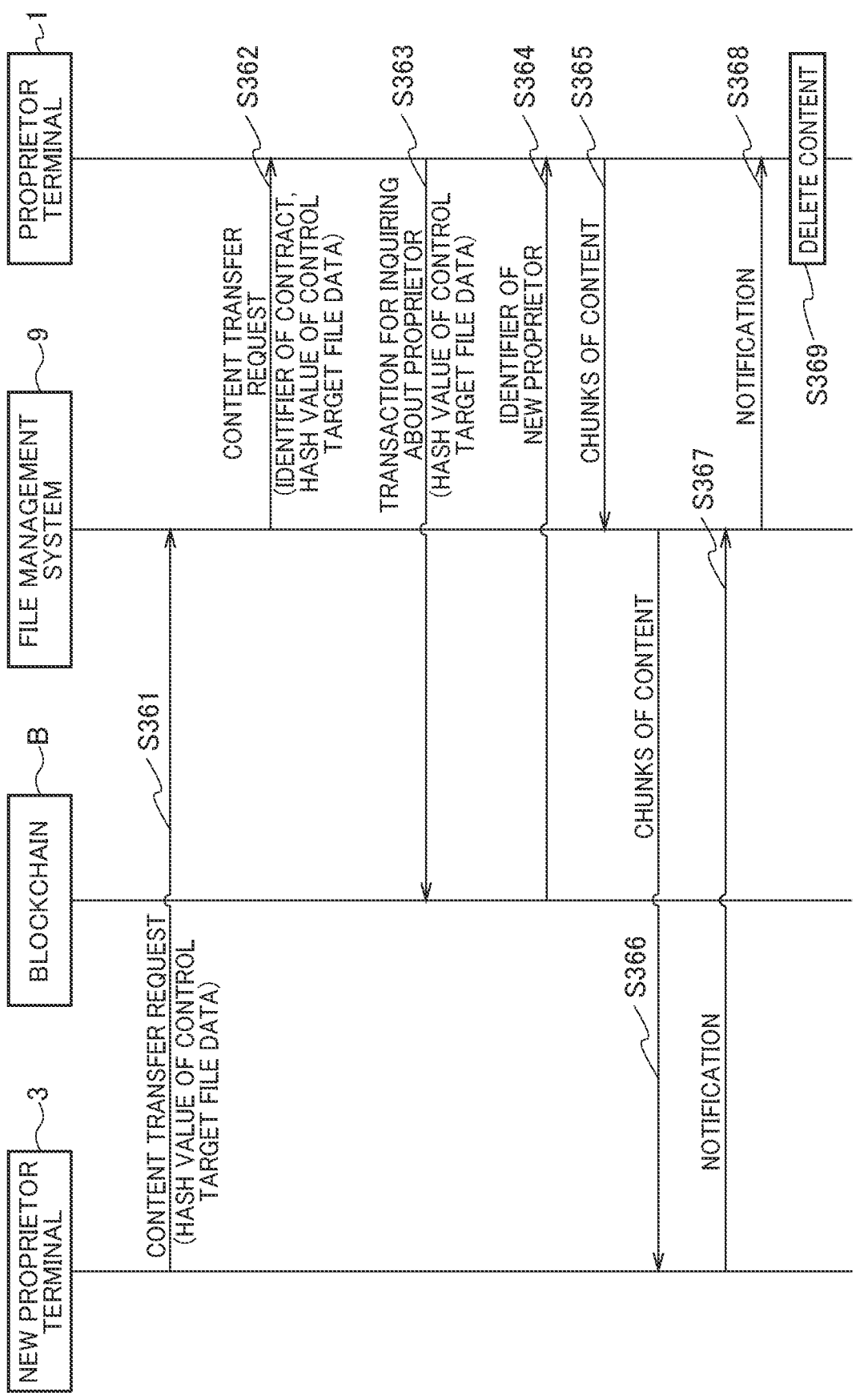
FIG. 15B is a sequence diagram for explaining processes of a new proprietor terminal requesting transfer of content data to a proprietor terminal in a content use system according to a modified example (Part 2).

With reference to FIGS. 15A and 15B, processes of the new proprietor terminal 3 requesting the transfer of the content data to the proprietor terminal 1 in a modified example will be described.

By performing processes of steps S351 to S357, the new proprietor terminal 3 acquires the route object data Obj' and the reference destination data R' related to the control target file data corresponding to the content data to be transferred. The processes are similar to the processes of steps S251 to S257 in FIG. 14A.

The processes at or after step S358 are similar to the processes at or after step S308 in FIG. 11A.

In the content use system 10 according to a modified example, the information on the content registered in the file management system 9 can be distributed and registered in the blockchain.

Other Embodiments

As described above, although an embodiment and a modified example thereof of the present invention have been described, the description and drawings which form a part of this disclosure should not be construed as limiting the present invention. Various alternative embodiments, examples, and operational techniques will be apparent to those skilled in the art from this disclosure.

For example, each terminal device such as the proprietor terminal described in an embodiment of the present invention may be constituted on one piece of hardware as shown in FIG. 5 or the like, or alternatively may be constituted on a plurality of pieces of hardware depending on the functions and the number of processes of the proprietor terminal.

The order of processes in an embodiment and a modified example of the present invention is merely an example and the present invention is not limited thereto.

It is needless to say that the present invention includes various embodiments and the like which are not described herein. Therefore, the technical scope of the present invention is determined only by the matters specifying the invention according to the claims which are reasonable from the above description.

EXPLANATION OF THE REFERENCE NUMERALS

1 Proprietor terminal
2 User terminal
3 New proprietor terminal
4 Blockchain control terminal
5 Blockchain network
6 Blockchain system
7 File management control terminal
8 File management network
9 File management system
10 Content use system
110, 210, 310 Storage device
111, 211, 311 Routing data
120, 220, 320 Processing device
121 Blockchain control unit
122 File management control unit
123 Route object generation unit
124 Sharing unit
125 Transfer unit
223 Use unit
323 Transfer request unit
B Blockchain data
Bb Blockchain body data
Bs State data
Obj Route object data
M Content management data
R Reference destination data

The invention claimed is:

1. A proprietor terminal configured to be used by a proprietor of content and configured to be connected to a distributed ledger system including a distributed ledger and a file management system, the proprietor terminal comprising one or more processors configured to perform operations comprising:

storing content data and state data including (i) an identifier of a contract executed in the distributed ledger system, (ii) a hash value of control target file data that specifies the content data managed by the contract, (iii) an identifier of the proprietor that generates content data and registers the content data in the file management system, and (iv) an identifier of a registered user that is authorized to use the content data in the file management system, which are associated with one another;

generating reference destination data including the identifier of the contract;

transmitting a transaction for generating route object data including the reference destination data and a link name and the hash value of the control target file data;

notifying the file management system of a hash value of the route object data and the hash value of the control target file data in association with the identifier of the proprietor;

receiving, via the file management system, a user request for the content data from a user terminal of a user acting as a request transmission source, the user request including the hash value of the control target file data specifying the content data;

obtaining the identifier of the registered user for the content data corresponding to the hash value of the control target file data, wherein the obtained identifier of the registered user is associated with the identifier of the contract of the reference destination data corresponding to the hash value of the control target file data in the state data;

determining that the obtained identifier of the registered user matches the identifier of the user acting as the request transmission source; and in response to determining that the obtained identifier of the registered user matches the identifier of the user acting as the request transmission source, transmitting, via the file management system, the content data specified by the control target file data to the user terminal.

2. The proprietor terminal according to claim 1, wherein the operations further comprise:

after receiving a transfer request including the hash value of the control target file data from a new proprietor terminal used by a new proprietor of the content via the file management system, transmitting the content data specified by the control target file data to the new proprietor terminal via the file management system if an identifier of the proprietor associated with the identifier of the contract of the reference destination data corresponding to the hash value of the control target file data and the hash value of the control target file data in the state data matches the identifier of the new proprietor as a transmission source, and deleting the content data from the proprietor terminal after receiving, from the new proprietor terminal, a notification that the new proprietor terminal holds the content data.

3. The proprietor terminal according to claim 1, wherein the route object data comprises a link name and a hash value of the reference destination data instead of including the reference destination data.

4. A user terminal configured to be used by a user of content data and configured to be connected to a distributed ledger system including a distributed ledger and a file management system, the user terminal comprising one or more processors configured to perform operations comprising:

storing state data including (i) an identifier of a contract executed in the distributed ledger system, (ii) a hash value of control target file data that specifies the content data managed by the contract, (iii) an identifier of a proprietor that generates content data and registers the content data in the file management system, (iv) an identifier of a registered user that is authorized to use the content data in the file management system, which are associated with one another, and (v) route object data including reference destination data including the identifier of the contract, and a link name and the hash value of the control target file data;

acquiring from the state data, an identifier of the proprietor associated with the identifier of the contract of the reference destination data corresponding to the hash value of the control target file data;

transmitting, via the file management system, a user request for the content data to a proprietor terminal of the proprietor that generates the content data, the user request including the hash value of the control target file data; and receiving, via the file management system, the content data upon the proprietor terminal determining that an identifier of the user matches the identifier of the registered user for the content data.

5. The user terminal according to claim 4, wherein the operations further comprise:

storing the route object data including a link name and a hash value of the reference destination data instead of including the reference destination data.

6. A new proprietor terminal configured to be used by a new proprietor to whom right of content data is transferred from a proprietor and is configured to be connected to a distributed ledger system including a distributed ledger and a file management system, the new proprietor terminal comprising one or more processors configured to perform operations comprising:

storing state data including (i) an identifier of a contract executed in the distributed ledger system, (ii) a hash value of control target file data that specifies the content data managed by the contract, (iii) an identifier of the proprietor that generates content data and registers the content data in the file management system, (iv) an identifier of a registered user that is authorized to use the content data in the file management system, which are associated with one another, and (v) route object data including reference destination data including the identifier of the contract, and a link name and the hash value of the control target file data;

acquiring, from the state data, an identifier of the proprietor associated with the identifier of the contract of the reference destination data corresponding to the hash value of the control target file data;

transmitting, to the distributed ledger system, a transaction for changing the identifier of the proprietor to the identifier of the new proprietor, the transaction specifying the identifier of the contract of the reference destination data corresponding to the hash value of the control target file data;

transmitting a transfer request including the hash value of the control target file data to a proprietor terminal used by the proprietor via the file management system;

receiving the content data via the file management system; and transmitting a notification that the new proprietor terminal holds the content data.

7. The new proprietor terminal according to claim 6, wherein the operations further comprise:
    storing the route object data including a link name and a hash value of the reference destination data instead of including the reference destination data.

* * * * *